US012766551B2

(12) United States Patent
Bircumshaw et al.

(10) Patent No.: US 12,766,551 B2
(45) Date of Patent: Oct. 20, 2026

(54) TRENCHES FOR THE REDUCTION OF CROSS-TALK IN MUT ARRAYS

(71) Applicant: eXo Imaging, Inc., Redwood City, CA (US)

(72) Inventors: Brian Bircumshaw, Oakland, CA (US); Sandeep Akkaraju, Wellesley, MA (US); Drake Guenther, Hillsborough, CA (US); Haesung Kwon, Austin, TX (US); Anthony Brock, Half Moon Bay, CA (US)

(73) Assignee: Exo Imaging, Inc., Santa Clara, CA (US)

( * ) Notice: Subject to any disclaimer, the term of this patent is extended or adjusted under 35 U.S.C. 154(b) by 880 days.

(21) Appl. No.: 17/215,776

(22) Filed: Mar. 29, 2021

(65) Prior Publication Data

US 2022/0304659 A1 Sep. 29, 2022

(51) Int. Cl.

| | |
|---|---|
| ***A61B 8/00*** | (2006.01) |
| ***B06B 1/02*** | (2006.01) |
| ***B06B 1/06*** | (2006.01) |
| ***G01N 29/24*** | (2006.01) |
| ***G06T 7/00*** | (2017.01) |

(52) U.S. Cl.

CPC .............. *B06B 1/0292* (2013.01); *B06B 1/06* (2013.01); *B06B 2201/76* (2013.01); *G06T 2207/10132* (2013.01)

(58) Field of Classification Search

CPC ..... B06B 1/06; B06B 1/0292; B06B 2201/76; G06T 2207/10132

USPC .......................................................... 310/324

See application file for complete search history.

(56) References Cited

U.S. PATENT DOCUMENTS

| | | | |
|---|---|---|---|
| 2,808,522 | A | 10/1957 | Dranetz |
| 3,088,323 | A | 5/1963 | Walter et al. |
| 4,156,800 | A | 5/1979 | Sear et al. |
| 4,211,949 | A | 7/1980 | Brisken et al. |
| 4,375,042 | A | 2/1983 | Marcus |
| 4,445,063 | A | 4/1984 | Smith |
| 4,517,842 | A | 5/1985 | Twomey et al. |
| 4,630,465 | A | 12/1986 | Hatton |
| 4,654,554 | A | 3/1987 | Kishi |
| 4,668,906 | A | 5/1987 | Ekstrand |
| 4,709,360 | A | 11/1987 | Martin et al. |
| 5,488,956 | A | 2/1996 | Bartelt et al. |
| 5,520,187 | A | 5/1996 | Snyder |

(Continued)

FOREIGN PATENT DOCUMENTS

| | | | |
|---|---|---|---|
| CN | 1445872 | A | 10/2003 |
| CN | 102577436 | A | 7/2012 |

(Continued)

OTHER PUBLICATIONS

U.S. Appl. No. 17/180,308 Office Action dated Dec. 10, 2021.

(Continued)

*Primary Examiner* — Emily P Pham
*Assistant Examiner* — Monica Mata
(74) *Attorney, Agent, or Firm* — Morgan, Lewis & Bockius LLP

(57) ABSTRACT

Described are micromachined ultrasonic transducer (MUT) arrays with trenches, reducing cross-talk between MUTs to mitigate undesirable artifacts in ultrasound images, as well as methods of making the same.

37 Claims, 15 Drawing Sheets

(56) References Cited

U.S. PATENT DOCUMENTS

| | | | |
|---|---|---|---|
| 5,548,564 | A | 8/1996 | Smith |
| 5,825,117 | A | 10/1998 | Ossmann et al. |
| 5,945,770 | A | 8/1999 | Hanafy |
| 6,051,895 | A | 4/2000 | Mercier |
| 6,108,121 | A | 8/2000 | Mansell et al. |
| 7,382,635 | B2 | 6/2008 | Noda |
| 7,532,093 | B1 | 5/2009 | Pulskamp et al. |
| 8,004,158 | B2 | 8/2011 | Hielscher |
| 8,626,295 | B2 | 1/2014 | Doron et al. |
| 9,067,779 | B1 | 6/2015 | Rothberg et al. |
| 9,479,875 | B2 | 10/2016 | Hall et al. |
| 10,106,397 | B1 | 10/2018 | Kim et al. |
| 10,648,852 | B2 | 5/2020 | Akkaraju et al. |
| 10,656,007 | B2 | 5/2020 | Akkaraju et al. |
| 10,969,270 | B2 | 4/2021 | Akkaraju et al. |
| 11,039,814 | B2 | 6/2021 | Akkaraju et al. |
| 2002/0109436 | A1 | 8/2002 | Peng et al. |
| 2004/0039246 | A1 | 2/2004 | Gellman et al. |
| 2004/0085858 | A1 | 5/2004 | Khuri-Yakub et al. |
| 2004/0190377 | A1 | 9/2004 | Lewandowski et al. |
| 2005/0134574 | A1 | 6/2005 | Hill |
| 2005/0146247 | A1 | 7/2005 | Fisher et al. |
| 2005/0148132 | A1 | 7/2005 | Wodnicki |
| 2005/0200242 | A1 | 9/2005 | Degertekin |
| 2006/0113866 | A1 | 6/2006 | Ganor |
| 2007/0103697 | A1 | 5/2007 | Degertekin |
| 2007/0197922 | A1 | 8/2007 | Bradley et al. |
| 2007/0205698 | A1 | 9/2007 | Chaggares et al. |
| 2008/0009741 | A1 | 1/2008 | Hyuga |
| 2008/0048211 | A1 | 2/2008 | Khuri-Yakub et al. |
| 2008/0194053 | A1 | 8/2008 | Huang |
| 2009/0001853 | A1 | 1/2009 | Adachi et al. |
| 2009/0140609 | A1 | 6/2009 | Huang |
| 2009/0250729 | A1 | 10/2009 | Lemmerhirt et al. |
| 2010/0168583 | A1 | 7/2010 | Dausch et al. |
| 2010/0225204 | A1 | 9/2010 | Hamann et al. |
| 2010/0256501 | A1 | 10/2010 | Degertekin |
| 2010/0301227 | A1 | 12/2010 | Muntean |
| 2010/0327695 | A1 | 12/2010 | Goel et al. |
| 2011/0051461 | A1 | 3/2011 | Buchwald et al. |
| 2011/0115333 | A1 | 5/2011 | Ezaki |
| 2011/0218594 | A1 | 9/2011 | Doron et al. |
| 2012/0068571 | A1 | 3/2012 | Chen |
| 2012/0091543 | A1 | 4/2012 | Torashima et al. |
| 2012/0103096 | A1 | 5/2012 | Kandori |
| 2012/0127136 | A1 | 5/2012 | Schneider et al. |
| 2012/0187508 | A1 | 7/2012 | Adler et al. |
| 2012/0206014 | A1 | 8/2012 | Bibl et al. |
| 2012/0238880 | A1 | 9/2012 | Davidsen |
| 2012/0250454 | A1 | 10/2012 | Rohling et al. |
| 2012/0289897 | A1 | 11/2012 | Friend et al. |
| 2012/0319174 | A1 | 12/2012 | Wang |
| 2012/0319535 | A1* | 12/2012 | Dausch .............. H10N 30/2047 310/365 |
| 2013/0039147 | A1 | 2/2013 | Witte et al. |
| 2013/0234559 | A1 | 9/2013 | Ermolov |
| 2013/0293065 | A1 | 11/2013 | Hajati et al. |
| 2013/0294201 | A1 | 11/2013 | Hajati |
| 2013/0331705 | A1 | 12/2013 | Fraser |
| 2014/0019072 | A1 | 1/2014 | Alles |
| 2014/0035735 | A1 | 2/2014 | Zellers et al. |
| 2014/0117812 | A1 | 5/2014 | Hajati |
| 2014/0145561 | A1 | 5/2014 | Jin et al. |
| 2014/0219063 | A1 | 8/2014 | Hajati et al. |
| 2014/0220723 | A1 | 8/2014 | Liu et al. |
| 2014/0225476 | A1 | 8/2014 | Degertekin et al. |
| 2014/0328504 | A1 | 11/2014 | Stephanou et al. |
| 2015/0097468 | A1 | 4/2015 | Hajati et al. |
| 2015/0145374 | A1 | 5/2015 | Xu et al. |
| 2015/0250452 | A1 | 9/2015 | Jin et al. |
| 2015/0265245 | A1 | 9/2015 | Von Ramm et al. |
| 2016/0027991 | A1 | 1/2016 | Suzuki |
| 2016/0041129 | A1 | 2/2016 | Cho et al. |
| 2016/0045935 | A1 | 2/2016 | Yoon et al. |
| 2016/0105748 | A1 | 4/2016 | Pal et al. |
| 2016/0107194 | A1 | 4/2016 | Panchawagh et al. |
| 2016/0136686 | A1 | 5/2016 | Brock-Fisher |
| 2016/0136687 | A1 | 5/2016 | Lewis, Jr. et al. |
| 2016/0262725 | A1 | 9/2016 | Boser et al. |
| 2016/0339475 | A1 | 11/2016 | Joyce |
| 2017/0021391 | A1 | 1/2017 | Guedes et al. |
| 2017/0209121 | A1 | 7/2017 | Davis, Sr. et al. |
| 2017/0232474 | A1 | 8/2017 | Oralkan et al. |
| 2017/0309808 | A1 | 10/2017 | Hada et al. |
| 2017/0312782 | A1* | 11/2017 | Morelli .................. G10K 11/02 |
| 2017/0319180 | A1 | 11/2017 | Henneken et al. |
| 2017/0322290 | A1 | 11/2017 | Ng et al. |
| 2017/0368574 | A1 | 12/2017 | Sammoura et al. |
| 2018/0153510 | A1 | 6/2018 | Haque et al. |
| 2019/0176193 | A1 | 6/2019 | Shulepov et al. |
| 2019/0316957 | A1 | 10/2019 | Akkaraju et al. |
| 2019/0316958 | A1 | 10/2019 | Akkaraju et al. |
| 2020/0156114 | A1* | 5/2020 | Gattere ................. B06B 1/0651 |
| 2020/0205776 | A1 | 7/2020 | Dekker et al. |
| 2020/0249079 | A1 | 8/2020 | Akkaraju et al. |
| 2020/0266798 | A1 | 8/2020 | Shelton et al. |
| 2021/0069748 | A1 | 3/2021 | Bircumshaw et al. |
| 2021/0078042 | A1 | 3/2021 | Bircumshaw et al. |
| 2021/0151661 | A1 | 5/2021 | Kwon et al. |
| 2021/0172788 | A1 | 6/2021 | Akkaraju et al. |
| 2021/0236090 | A1 | 8/2021 | Akkaraju et al. |
| 2021/0364348 | A1 | 11/2021 | Akkaraju et al. |
| 2022/0193722 | A1 | 6/2022 | Bircumshaw et al. |
| 2022/0205836 | A1 | 6/2022 | Akkaraju et al. |

FOREIGN PATENT DOCUMENTS

| | | | |
|---|---|---|---|
| CN | 101589543 | B | 10/2012 |
| CN | 104271266 | A | 1/2015 |
| CN | 105310718 | A | 2/2016 |
| CN | 106500824 | A | 3/2017 |
| CN | 106999163 | A | 8/2017 |
| CN | 107343246 | A | 11/2017 |
| EP | 1992290 | A1 | 11/2008 |
| EP | 1436097 | B1 | 2/2016 |
| EP | 3453056 | A1 | 3/2019 |
| JP | S61223683 | A | 10/1986 |
| JP | S6276392 | A | 4/1987 |
| JP | H02218983 | A | 8/1990 |
| JP | H06350155 | A | 12/1994 |
| JP | 2005-295553 | A | 10/2005 |
| JP | 2007088805 | A | 4/2007 |
| JP | 2007510324 | A | 4/2007 |
| JP | 2007229327 | A | 9/2007 |
| JP | 2008118631 | A | 5/2008 |
| JP | 2009165212 | A | 7/2009 |
| JP | 2012129662 | A | 7/2012 |
| JP | 2013123150 | A | 6/2013 |
| JP | 2014000122 | A | 1/2014 |
| JP | 2014127921 | A | 7/2014 |
| JP | 2015-109634 | A | 6/2015 |
| JP | 2015-154480 | A | 8/2015 |
| JP | 2016503312 | A | 2/2016 |
| JP | 2017528940 | A | 9/2017 |
| JP | 2018046512 | A | 3/2018 |
| WO | WO-2006123300 | A2 | 11/2006 |
| WO | WO-2007099696 | A1 | 9/2007 |
| WO | WO-2011026187 | A1 | 3/2011 |
| WO | WO-2011033887 | A1 | 3/2011 |
| WO | WO-2012117996 | A1 | 9/2012 |
| WO | WO-2013043906 | A1 | 3/2013 |
| WO | WO-2013158348 | A1 | 10/2013 |
| WO | WO-2015131083 | A1 | 9/2015 |
| WO | WO2016054447 | A1 | 4/2016 |
| WO | WO-2017025438 | A1 | 2/2017 |
| WO | WO-2017132517 | A1 | 8/2017 |
| WO | WO-2017182344 | A1 | 10/2017 |
| WO | WO-2017216139 | A1 | 12/2017 |
| WO | WO-2018102223 | A1 | 6/2018 |
| WO | WO-2019164721 | A1 | 8/2019 |
| WO | WO-2019199397 | A1 | 10/2019 |
| WO | WO-2019199398 | A1 | 10/2019 |

(56) References Cited

FOREIGN PATENT DOCUMENTS

| | | | |
|---|---|---|---|
| WO | WO-2019226547 | A1 | 11/2019 |
| WO | WO-2020028580 | A1 | 2/2020 |
| WO | WO-2021050853 | A1 | 3/2021 |

OTHER PUBLICATIONS

Supplementary European Search Report of U.S. Appl. No. 21/870,501, dated Jul. 7, 2023, 8 pages.

APC International, Ceramic manufacturing series—poling PZT ceramics. https://www.americanpiezo.com/blog/ceramic-manufacturing-series-poling-pzt-ceramics/ [1-3] (2016).

Assef et al., A reconfigurable arbitrary waveform generator using PWM modulation for ultrasound research. BioMedical Engineering OnLine 12:24 [1-13] (2013).

Choudhry et al., Comparison of tissue harmonic imaging with conventional US in abdominal disease. RadioGraphics: Imaging and Therapeutic Technology 20:1127-1135 (2000).

Dahl, Ultrasound beamforming and image formation. http://people.duke.edu/-jjd/RSNA_USbeamforming.pdf [Slide presentation] (c. 2005).

Dausch et al., Theory and operation of 2-D array piezoelectric micromachined ultrasound transducers. IEEE Transactions on Ultrasonics, Ferroelectrics, and Frequency Control 55(11):2484-2492 (2008).

Doerry, Generating nonlinear FM chirp waveforms for radar. Sandia Report, SAND2006-5856:1-34 (2006).

Felix et al., Biplane ultrasound arrays with integrated multiplexing solution for enhanced diagnostic accuracy in endorectal and transvaginal imaging. http://www.vermon.com/vermon/publications/Felix_UFFC_2005.pdf (2005).

Goldman, Apple's Lightning connector and you: what you should know. CNET Sep. 19, 2012: https://www.cnet.com/news/apples-lightning-connector-and-you-what-you-should-know/ (2012).

Guedes et al., Aluminum nitride pMUT based on a flexurally-suspended membrane. IEEE 16th International Solid-State Sensors, Actuators and Microsystems Conference:12169346 (2011).

Hajati et al., Three-dimensional micro electromechanical system piezoelectric ultrasound transducer. Appl. Phys. Lett. 101:253101 (2012); doi: 10.1063/1.4772469 (2012).

Harput, Use of chirps in medical ultrasound imaging. Ultrasound Group, School of Electronic and Electrical Engineering, University of Leeds, PHD Thesis, Dec. 2012.

Karki, Signal conditioning piezoelectric sensors. Texas Instruments Application report, SLA033A:1-5 (2000).

Khuri-Yakub et al., Capacitive micro machined ultrasonic transducers for medical imaging and therapy. Journal of Micromech Microeng. 21(5):054004-054014 (2011).

Lach et al., Piezoelectric materials for ultrasonic probes. http://www.ndt.net/article/platte2/platte2.htm NDTnet 1(9):1-9 (1996).

Lee et al., Wafer-to-wafer alignment for three-dimensional integration: a review. Journal of MicroElectroMechanical Systems 20(4):885-898 (2011).

Lu et al., High frequency piezoelectric micromachined ultrasonic transducer array for intravascular ultrasound imaging. Proceedings of the IEEE International Conference on Micro Electro Mechanical Systems (MEMS):06765748 (2014).

Martin, Introduction to B-mode imaging. Cambridge University Press; Diagnostic Ultrasound: Physics and equipment, 2nd Edition. Chapter 1:1-10 (2010).

Mina, High frequency transducers from PZT films. Materials Science and Engineering Thesis; Pennsylvania State University:1-199 (2007).

Moazzami et al., Electrical characteristics of ferroelectric PZT thin films for DRAM applications. IEEE Transaction on Electron Devices 39(9):2044-2049 (1992).

Orenstein Scanning in pain—sonographers seek relief from job-related hazard. Radiology Today 10(8):24 (2009).

Ovland, Coherent plane-wave compounding in medical ultrasound imaging. NTNU-Trondheim, Norwegian University of Science and Technology, Master of Science Thesis, 1-62 (Jun. 2012).

PCT/US2017/063163 International Search Report and Written Opinion dated Feb. 15, 2018.

PCT/US2019/021501 International Search Report and Written Opinion dated Jul. 12, 2019.

PCT/US2019/021515 International Search Report and Written Opinion dated May 31, 2019.

PCT/US2019/033119 International Search Report and Written Opinion dated Aug. 9, 2019.

PCT/US2019/044528 International Search Report and Written Opinion dated Oct. 16, 2019.

PCT/US2020/050374 International Search Report and Written Opinion dated Feb. 2, 2021.

PCT/US2020/050374 Invitation to Pay Additional Fees dated Nov. 13, 2020.

PCT/US2021/024667 International Search Report and Written Opinion dated Jul. 8, 2021.

PCT/US2021/025109 International Search Report and Written Opinion dated Jul. 7, 2021.

Pye et al., Adaptive time gain compensation for ultrasonic imaging. Ultrasound in Medicine and Biology 18(2):205-212 [abstract] (1992).

Rodriguez et al., Low cost matching network for ultrasonic transducers. Physics Procedia 3:1025-1031 (2010).

Smyth, Design and modeling of a PZT thin film based piezoelectric micromachined ultrasonic transducer (PMUT). MSME Thesis, MIT:1-156 (2012).

Spectral doppler. http://www.echocardiographer.org/Echo%20Physics/spectral%20doppler.html (2017).

Szabo. Diagnostic ultrasound imaging: inside out. Elsevier Academic Press, ISBN: 0-12-680145-2 (572 pgs) (2014).

Trots et al., Synthetic aperture method in ultrasound imaging. InTech Press; Ultrasound Imaging, Masayuki Tanabe (Ed.). http://www.intechopen.com/books/ultrasound-imaging/synthetic-aperture-method-in-ultrasound-imaging. Chapter 3:37-56 (2011).

U.S. Appl. No. 15/820,319 Office Action dated May 14, 2020.

U.S. Appl. No. 15/951,118 Office Action dated Sep. 20, 2019.

U.S. Appl. No. 15/951,121 Office Action dated May 6, 2019.

U.S. Appl. No. 15/951,121 Office Action dated Nov. 19, 2019.

U.S. Appl. No. 16/833,333 Office Action dated Sep. 8, 2020.

U.S. Appl. No. 16/837,800 Office Action dated May 7, 2021.

Wang et al., Broadband piezoelectric micromachined ultrasonic transducer (pMUT) using mode-merged design. Proceedings of the 10th IEEE International Conference on Nano/Micro Engineered and Molecular Systems (IEEE-NEMS 2015):15260900. Xi'an, China, Apr. 7-11, 2015.

Wang et al., Zero-bending piezoelectric micromachined ultrasonic transducer (pMUT) with enhanced transmitting performance. Journal of Microelectromechanical Systems 24(6):2083-2091 (2015).

Zhang et al. Double-SOI wafer-bonded CMUTs with improved electrical safety and minimal roughness of dielectric and electrode surfaces. Journal of microelectromechanical systems 21(3):668-680 (2012).

Co-pending U.S. Appl. No. 17/218,656, inventors Kwon; Haesung et al., filed Mar. 31, 2021.

Co-pending U.S. Appl. No. 17/364,381, inventors Mantravadi; Naresh et al., filed Jun. 30, 2021.

Co-pending U.S. Appl. No. 17/364,397, inventors Kwon; Haesung et al., filed Jun. 30, 2021.

Hill et al. The Role Radius of Curvature Plays in Thiolated Oligonucleotide Loading on Gold Nanopartictes. ACS Nano 3(2):418-424 (2009) Retrieved on Sep. 2, 2021 from https://www.ncbi.nlm.nih.gov/pmc/articles/PMC3241534.

PCT/US2021/039977 International Search Report and Written Opinion dated Oct. 6, 2021.

PCT/US2021/039994 International Search Report and Written Opinion dated Nov. 5, 2021.

Office Action in Japanese Application No. 2022-519594, dated Sep. 13, 2024, 10 pages, including translation.

* cited by examiner

TRENCHES FOR THE REDUCTION OF CROSS-TALK IN MUT ARRAYS

CROSS-REFERENCE

This application claims the benefit of U.S. patent application Ser. No. 17/215,776 filed Mar. 29, 2021, which is incorporated herein by reference in its entirety.

BACKGROUND

Micromachined ultrasonic transducers (MUTs) offer great potential in many fields, including but not limited to medical imaging, air-coupled imaging, distance monitoring, fingerprint monitoring, non-destructive defect monitoring, and diagnosis. In many of these applications, there are more than one MUT acting in concert. For example, for higher end medical ultrasound imaging, it is reasonable to find systems with 1024, 2048, or 4096 MUTs.

SUMMARY

To operate properly, the MUTs are designed to transmit energy into the acoustic medium to which they are attached. Take the generalized example of a MUT array in FIG. 1A. In this case, the MUTs are represented by the movable diaphragms 101*a*, 101*b*, 101*c* which are formed in or on top of the substrate 100 by cavities 120*a*, 120*b*, and 120*c*. The diaphragms 101*a*, 101*b*, 101*c* are coupled acoustically to the semi-infinite acoustic medium 200 at an interface 110. The acoustic medium 200 can be any substance, or a plurality of substances; common media include air, water, tissue, electrolytic gel, metal, silicone rubbers used as matching layers to the body, etc.

During operation, the diaphragms 101*a*-101*c* are excited into motion, primarily in the z-direction. The excitation is generally created by a piezoelectric effect (for piezoelectric MUTs (pMUTs)) or a capacitive effect (for capacitive MUTs (cMUTs)). In both cases, the motion of the diaphragm creates pressure waves that transmit into the acoustic medium 200. However, the diaphragm motion also creates unwanted waves outside the acoustic medium 200. The most common unwanted waves are elastic compression waves that travel within and through the substrate 100, and interfacial waves that travel along the interface 110 between the substrate 100 and the acoustic medium 200, as well as other interfaces attached to the substrate 100.

All energy radiated outside the acoustic medium 200 is unwanted. Not only is it wasted power, but it can interfere with the MUT's functioning. For example, in medical imaging, the elastic compression waves will rebound off other surfaces and cause artifacts such as a static image over the medically relevant image formed from the reflected energy from the acoustic medium 200. As another example, the interfacial waves that travel along the interface 110 will create cross-talk in medical imaging, creating a spot-lighting effect and unwanted ghost images.

A generalized example of a MUT array 210 is shown in FIG. 1B. The MUT array 210 comprises a substrate 100 and a plurality of MUTs 101. The plurality of MUTs 101 are affixed to a surface of the substrate. Each MUT comprises a moveable diaphragm as shown in FIG. 1A. In some embodiments, each of the MUTs 101 is a pMUT. In some embodiments, each of the MUTs 101 is a cMUT. The MUTs 101 may be arranged in a two-dimensional array 210 arranged in orthogonal directions. That is, the MUTs 101 are be formed into a two-dimensional M×N array 210 with N columns and M rows of MUTs 101. The number of columns (N) and the number of rows (M) may be the same or different. In some instances, the array 210 may be curved, e.g., to provide a wider angle of an object being imaged. In some instances, the array may offer different packing such as hexagonal packing, rather than the standard square packing displayed in FIG. 1B. In some instances, the array may be asymmetrical, e.g., as described in U.S. Pat. No. 10,656,007, the entire contents of which are incorporated herein by reference.

The present disclosure provides a novel solution to address the issue of compression and interfacial waves in MUT arrays and the cross-talk they create. FIG. 2 provides an example of this cross-talk in a MUT array formed from a silicon substrate 100 coupled to a water acoustic medium 200. The diagonal ripples 220 represent traveling pressure waves. The two dashed lines 230 represent the speed of sound of the water acoustic medium (approximately 1,480 m/s). Ripples and high amplitude data 240 below these lines 230 typically represents good acoustic data. The data 250 above the two dashed lines 230 represent various forms of cross-talk.

Taking spatial and temporal Fourier transforms of the data in FIG. 2 yields the f-k plot in FIG. 3. In FIG. 3 we can see that the cross-talk acoustic energy, circled with a dashed line 300, is distributed around 2,000 to 6,000 m/s. The longitudinal speed of sound in silicon is approximately 8,800 m/s, while the interfacial wave speed for Rayleigh and Shear waves is between 5,000 and 5,500 m/s. This suggests that the cross-talk energy may be due to a combination of interfacial and bulk waves.

Using a MUT array like the one used to produce the output depicted in FIGS. 2 and 3 for imaging a phantom produces a result like that of FIG. 4. Two artifacts are clearly visible: (1) a "spotlight" effect 420 in which the central part of the image is brighter than the edges, and (2) "ghost" images 430 of high reflection targets are apparent at the edges of the image.

The artifacts of such cross-talk energies are undesirable. We disclose herein a general technique for disrupting compressional and interfacial waves and significantly reducing cross-talk between MUTs.

In one aspect, disclosed herein is a MUT array comprising a substrate and a plurality of MUTs. The plurality of MUTs are affixed to a surface of the substrate. Each MUT comprises a moveable diaphragm. The substrate comprises a trench at least partially around a perimeter of the diaphragm of one or more MUTs of the plurality of MUTs. In some embodiments, each MUT in the plurality of MUTs is a pMUT. In some embodiments, each MUT in the plurality of MUTs is a cMUT.

In some embodiments, the trench runs from the surface of the substrate to at least 10%, at least 50%, or at least 90% the thickness of the substrate. In some embodiments, the trench runs the entire thickness of the substrate.

In some embodiments, the trench runs from below the surface of the substrate to at least 10%, at least 50%, or at least 90% the thickness of the substrate.

In some embodiments, the trench runs from an opposite surface of the substrate at least 10%, at least 50%, or at least 90% of the thickness of the substrate.

In some embodiments, the trench has a constant width between 1 μm and 40 μm. In some embodiments, the trench has a variable width between 1 μm and 40 μm.

In some embodiments, the trench has a constant distance from the perimeter of the diaphragm between 1 μm and 40

μm. In some embodiments, the trench has a variable distance from the perimeter of the diaphragm between 1 μm and 40 μm.

In some embodiments, the trench is around at least 50%, 60%, 70%, 80%, or 90% of the perimeter of the diaphragm. In some embodiments, the trench is around the entire perimeter of the diaphragm.

In some embodiments, the trench is at least partially around a perimeter of the diaphragm of at least 10%, at least 20%, at least 30%, at least 40%, at least 50%, at least 60%, at least 70%, at least 80%, or at least 90% of the MUTs of the plurality of MUTs. In some embodiments, the trench is at least partially around a perimeter of the diaphragm of each MUT of the plurality of MUTs.

In some embodiments, the trench is at least partially filled with an acoustic attenuation material.

In some embodiments, the plurality of MUTs are arranged in a plurality of columns and a plurality of rows. In some embodiments, the trench runs along a row of MUTs. In some embodiments, each row of MUTs has a trench running therealong. In some embodiments, the trench runs along a column of MUTs. In some embodiments, each column of MUTs has a trench running therealong. In some embodiments, each row of MUTs has a first trench running therealong and each column of MUTs has a second trench running therealong.

In some embodiments, the trench is at least partially around a perimeter of the diaphragm of a single MUT of the plurality of MUTs.

In some embodiments, each MUT of the plurality of MUTs is at least partially surrounded by a trench.

In some embodiments, the MUT array further comprises at least a second trench at least partially around the perimeter of the diaphragm of one or more MUTs of the plurality of MUTs. In some embodiments, the second trench is at least partially around the perimeter of the diaphragm of a single MUT of the plurality of MUTs. In some embodiments, each MUT of the plurality of MUTs is at least partially surrounded by a first trench and a second trench.

In some embodiments, the trench is disposed between an adjacent pair of MUTs.

In some embodiments, the substrate comprises a plurality of trenches at least partially around the perimeter of the diaphragm of one or more MUTs of the plurality of MUTs. In some embodiments, the substrate comprises one trench per MUT of the plurality of MUTs. In some embodiments, the substrate comprises one trench per adjacent pair of MUTs of the plurality of MUTs. In some embodiments, the substrate comprises fewer than one trench per MUT of the plurality of MUTs. In some embodiments, the substrate comprises fewer than one trench per adjacent pair of MUTs of the plurality of MUTs. In some embodiments, the substrate comprises more than one trench per MUT of the plurality of MUTs. In some embodiments, the substrate comprises more than one trench per adjacent pair of MUTs of the plurality of MUTs.

In some embodiments, the MUT array is configured for medical imaging.

In another aspect, disclosed herein is a method of fabricating a MUT array.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1A:
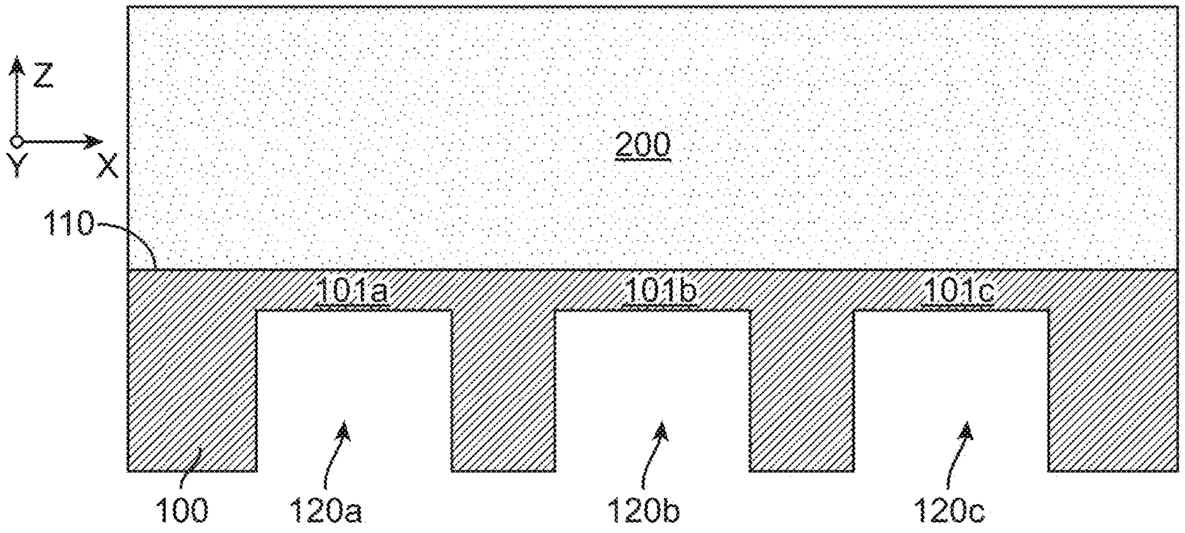
FIG. 1A is a schematic diagram showing a cross-section of a generalized MUT array (101*a*-101*c*) attached to an acoustic medium 200, in accordance with embodiments.

Described herein, in certain embodiments, are micromachined ultrasound transducer (MUT) arrays.

In one aspect, disclosed herein is a MUT array comprising a substrate and a plurality of MUTs. The plurality of MUTs are affixed to a surface of the substrate. Each MUT comprises a moveable diaphragm. The substrate comprises a trench at least partially around a perimeter of the diaphragm of one or more MUTs of the plurality of MUTs. In some embodiments, each MUT in the plurality of MUTs is a pMUT. In some embodiments, each MUT in the plurality of MUTs is a cMUT.

In some embodiments, the trench runs from the surface of the substrate to at least 10%, at least 50%, or at least 90% the thickness of the substrate. In some embodiments, the trench runs the entire thickness of the substrate.

In some embodiments, the trench runs from an opposite surface of the substrate to at least 10%, at least 50%, or at least 90% the thickness of the substrate.

In some embodiments, the trench runs from below the surface of the substrate to at least 10%, at least 50%, or at least 90% the thickness of the substrate.

In some embodiments, the trench has a constant width between 1 μm and 40 μm. In some embodiments, the trench has a variable width between 1 μm and 40 μm.

In some embodiments, the trench has a constant distance from the perimeter of the diaphragm between 1 μm and 40 μm. In some embodiments, the trench has a variable distance from the perimeter of the diaphragm between 1 μm and 40 μm.

In some embodiments, the trench is around at least 50%, 70%, or 90% of the perimeter of the diaphragm. In some embodiments, the trench is around the entire perimeter of the diaphragm.

In some embodiments, the trench is at least partially around a perimeter of the diaphragm of at least 10%, at least 20%, at least 30%, at least 40%, at least 50%, at least 60%, at least 70%, at least 80%, or at least 90% of the MUTs of the plurality of MUTs. In some embodiments, the trench is at least partially around a perimeter of the diaphragm of each MUT of the plurality of MUTs.

In some embodiments, the trench is at least partially filled with an acoustic attenuation material.

In some embodiments, the MUT array is configured for medical imaging.

Also described herein, in certain embodiments, are methods of fabricating a micromachined ultrasound transducer (MUT) array.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Muts

The present disclosure may be utilized in the context of imaging devices that utilize micromachined ultrasound transducer (MUT) technology, including either piezoelectric micromachined ultrasound transducer (pMUT) or capacitive micromachine ultrasonic transducer (cMUT) technologies.

Figure 1B:
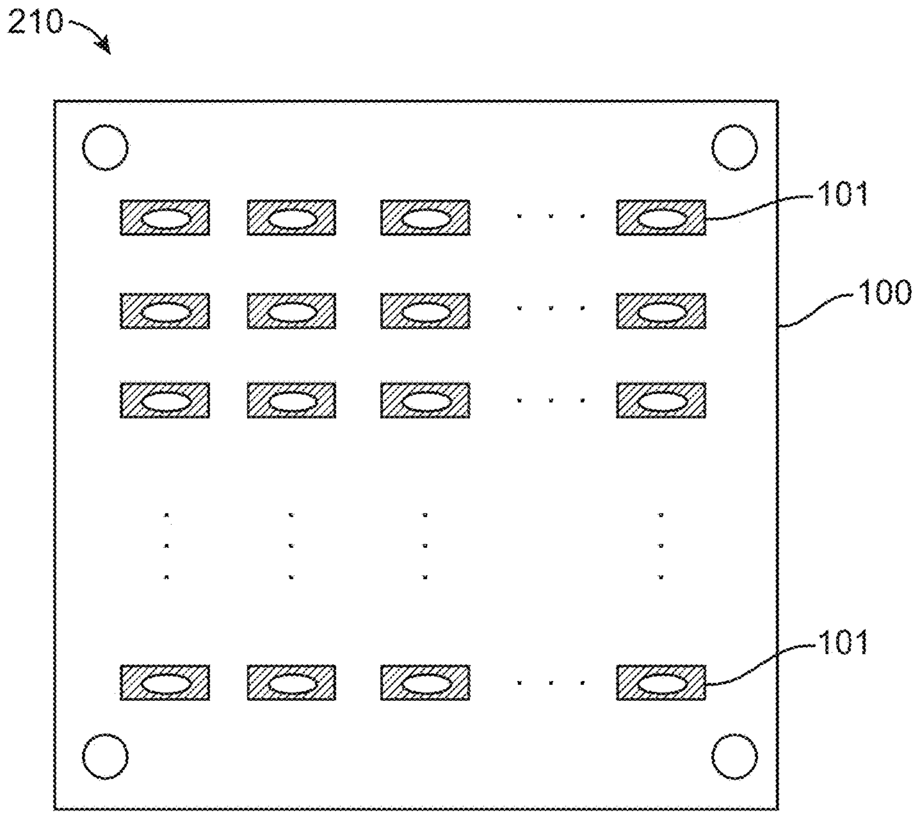
FIG. 1B shows a top view of a MUT array 210, in accordance with embodiments.
Figure 1C:
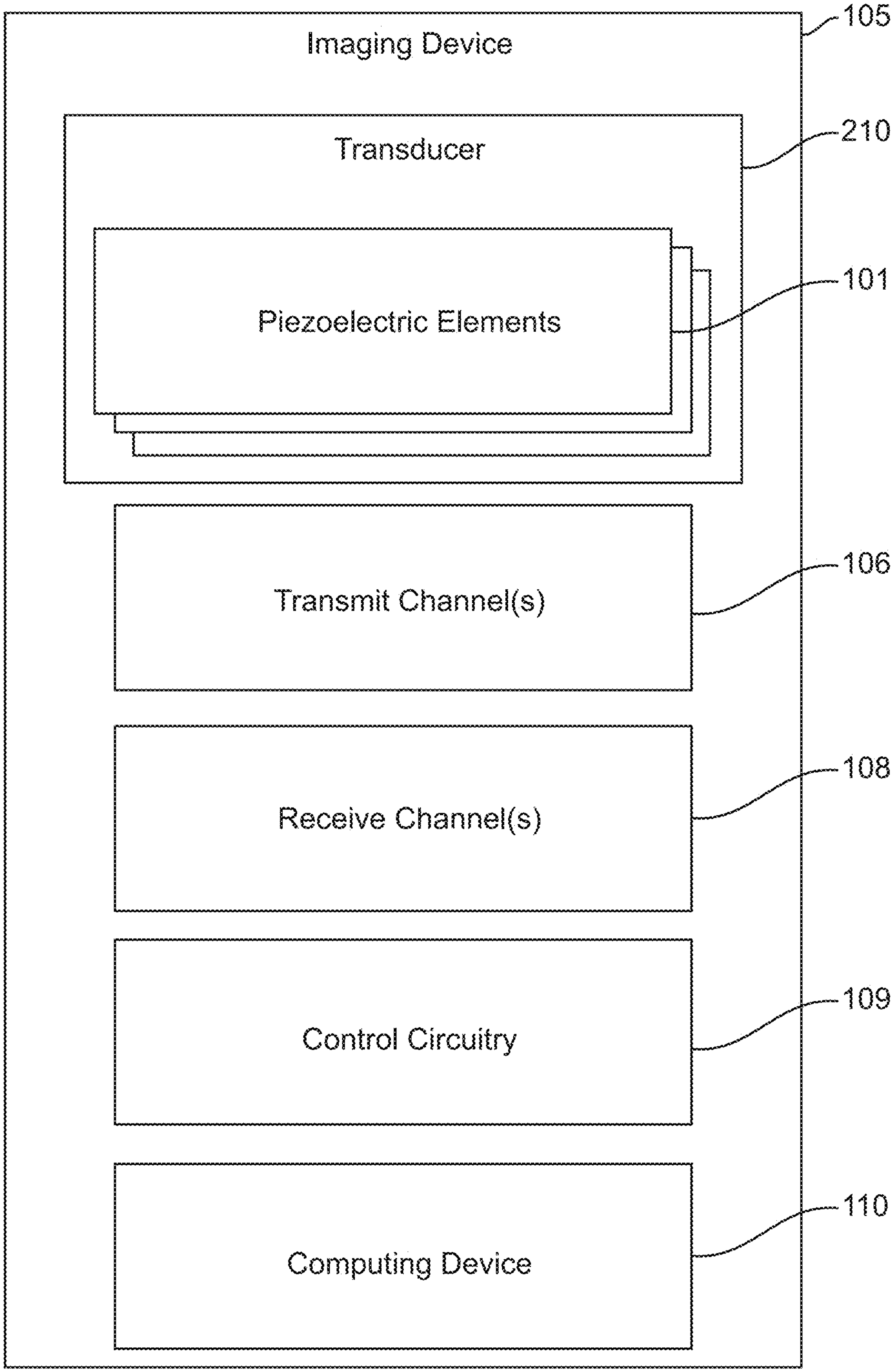
FIG. 1C is a block diagram of an imaging device 105, in accordance with embodiments.

FIG. 1C is a block diagram of an imaging device 105 with selectively alterable channels 106, 108, controlled by a controller 109, and having imaging computations performed on a computing device 110 according to principles described herein. The imaging device 105 may be used to generate an image of internal tissue, bones, blood flow, or organs of human or animal bodies. Accordingly, the imaging device 105 transmits a signal into the body and receives a reflected signal from the body part being imaged. Such imaging devices may include either pMUT or cMUT, which may be referred to as transceivers or imagers, which may be based on photo-acoustic or ultrasonic effects. The imaging device 105 can be used to image other objects as well. For example, the imaging device 105 can be used in medical imaging; flow measurements in pipes, speaker, and microphone arrays; lithotripsy; localized tissue heating for therapeutic; and highly intensive focused ultrasound (HIFU) surgery.

In addition to use with human patients, the imaging device 105 may be used to get an image of internal organs of an animal as well. Moreover, in addition to imaging internal organs, the imaging device 105 may also be used to determine direction and velocity of blood flow in arteries and veins as in Doppler mode imaging and may also be used to measure tissue stiffness.

The imaging device 105 may be used to perform different types of imaging. For example, the imaging device 105 may be used to perform one dimensional imaging, also known as A-Scan, two dimensional imaging, also known as B scan, three dimensional imaging, also known as C scan, and Doppler imaging. The imaging device 105 may be switched to different imaging modes and electronically configured under program control.

To facilitate such imaging, the imaging device 105 includes an array of pMUT or cMUT transducers 210, each transducer 210 including an array of transducer elements (i.e., MUTs) 101. The MUTs 101 operate to 1) generate the pressure waves that are passed through the body or other mass and 2) receive reflected waves off the object within the body, or other mass, to be imaged. In some examples, the imaging device 105 may be configured to simultaneously transmit and receive ultrasonic waveforms. For example, certain MUTs 101 may send pressure waves toward the target object being imaged while other MUTs 101 receive the pressure waves reflected from the target object and develop electrical charges in response to the received waves.

Figure 1D:
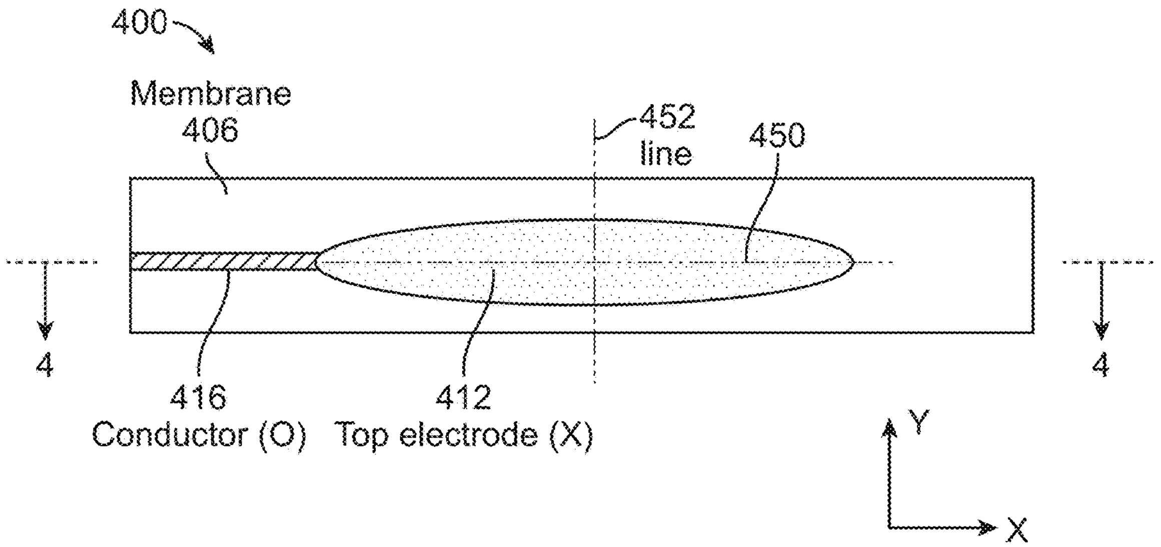
FIG. 1D shows a top view of a MUT, in accordance with embodiments.
Figure 1E:
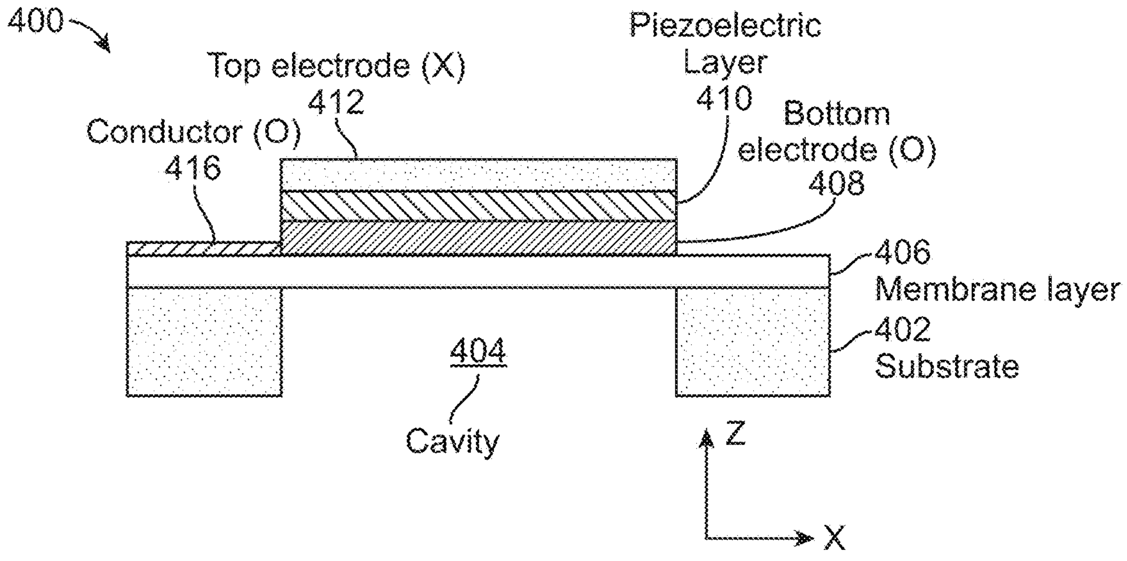
FIG. 1E shows a cross-sectional view of a MUT, taken along a direction 4-4 in FIG. 1D, in accordance with embodiments.
Figure 2:
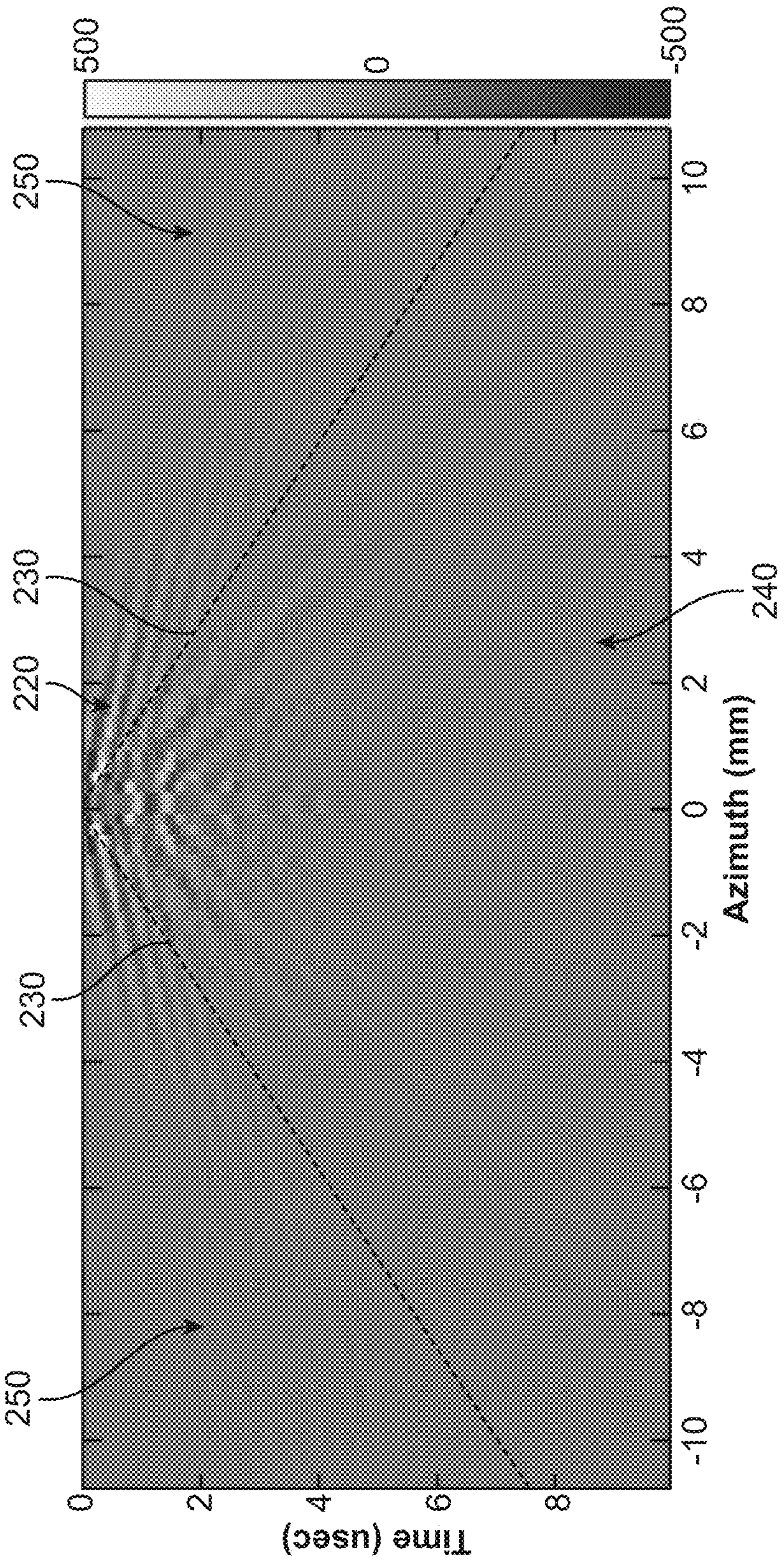
FIG. 2 is a graph showing amplitude of motion of a MUT array with 128 elements in the azimuth direction, spanning approximately 22 mm, in accordance with embodiments. The center two MUTs were actuated, and the other 126 MUTs were monitored for response. The grey level indicates positive (towards white) or negative (towards black) diaphragm deflection. The two fired elements were eliminated from the plot so that the cross-talk ripples could be visualized. The dashed lines 230 approximately represent the imaging cone, defined by wave with a 1,480 m/s velocity.

FIG. 1D shows a top view of an exemplary MUT 400 (in this example, a pMUT). FIG. 1E shows a cross-sectional view of the MUT 400 in FIG. 1D, taken along the line 4-4, according to embodiments of the present disclosure. The MUT 400 may be substantially similar to the MUT 101 described herein. As depicted, the MUT may include: a membrane layer 406 suspended from a substrate 402 and disposed over a cavity 404; a bottom electrode (0) 408 disposed on the membrane layer (or, shortly membrane)

406; a piezoelectric layer 410 disposed on the bottom electrode (0) 408; and a top electrode (X) 412 disposed on the piezoelectric layer 410.

MUTs, whether cMUTs or pMUTs, can be efficiently formed on a substrate leveraging various semiconductor wafer manufacturing operations. Semiconductor wafers may come in 6 inch, 8 inch, and 12 inch sizes and are capable of housing hundreds of transducer arrays. These semiconductor wafers start as a silicon substrate on which various processing steps are performed. An example of such an operation is the formation of $SiO_2$ layers, also known as insulating oxides. Various other steps such as the addition of metal layers to serve as interconnects and bond pads are performed to allow connection to other electronics. Yet another example of a machine operation is the etching of cavities (e.g., cavity 404 in FIG. 1E) in the substrate.

Figure 5A:
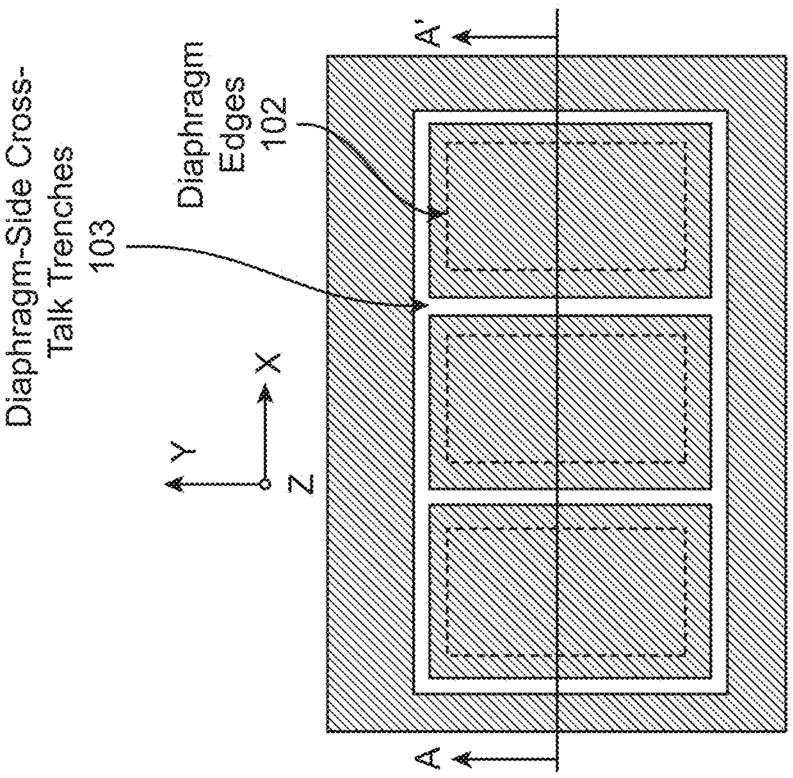
FIGS. 5A and 5B are exemplary schematic diagrams showing (a) layout and (b) cross-section views of a generalized MUT array (101*a*-101*c*) with diaphragm-side cross-talk trenches 103, in accordance with embodiments.
Figure 5B:
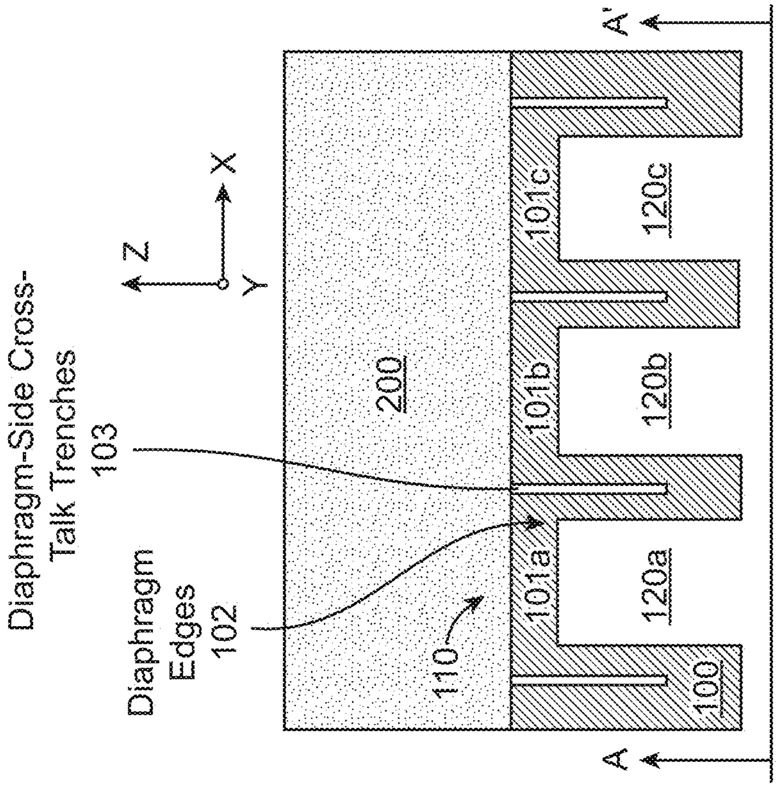

To significantly reduce cross-talk, according to the present disclosure, during the wafer manufacturing process, a trench 103 is formed within the substrate 100 that roughly surrounds each MUT 101. An example of this is depicted in FIGS. 5A and 5B. FIG. 5A shows an exemplary schematic diagram showing a generalized MUT array (101*a*-101*c*) with diaphragm-side cross-talk trenches 103. FIG. 5B shows a cross-sectional view of the MUT array in FIG. 5A, taken along line A-A'. The MUT array may be substantially similar to the array depicted in FIGS. 1A-1C with the addition of one or more trenches 103. The MUT array 210 comprises a substrate 100 and a plurality of MUTs 101*a*-101*c*. The plurality of MUTs 101*a*-101*c* are affixed to a surface of the substrate 100. Each MUT 101*a*-101*c* comprises a moveable diaphragm. The substrate 100 comprises a trench 103 at least partially around a perimeter of the diaphragm 101*a*-101*c* of the plurality of MUTs. The trench 103 introduces an impedance mismatch between the substrate 100 and whatever material is within the cross-talk trenches 103. This impedance mismatch disrupts the cross-talk waves through attenuation, reflection, and scattering.

Figure 3:
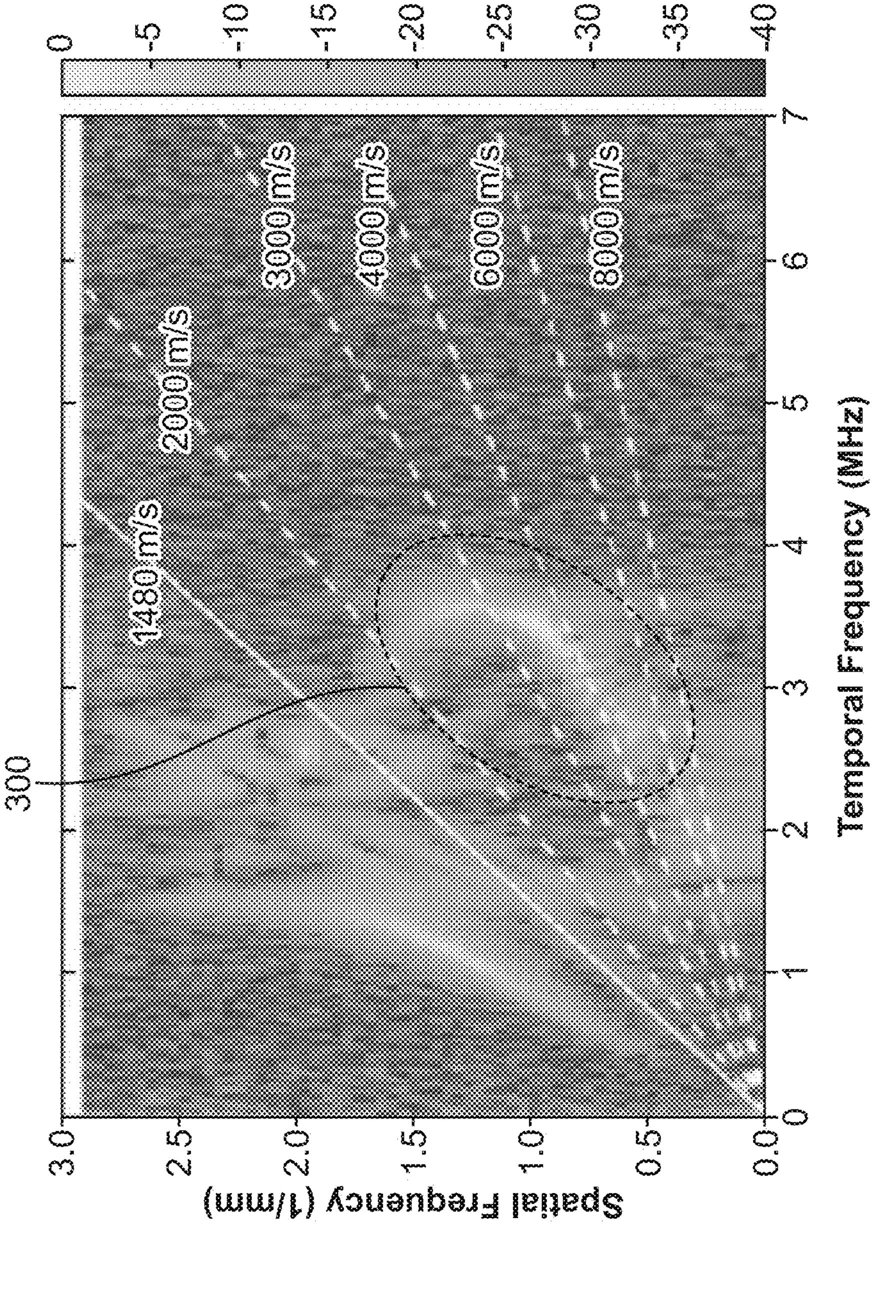
FIG. 3 is a graph showing a Fourier transform in space and time (also referred to as an f-k plot) of the data from FIG. 2, representing the data in spatial and frequency domains, in accordance with embodiments. The amplitude is plotted in dB relative to the maximum amplitude of the Fourier data, with white data having a higher amplitude black blue data. The data 300 circled in between 2 and 4 MHz and 0.5 and 1.5 μsec is undesired cross-talk.
Figure 4:
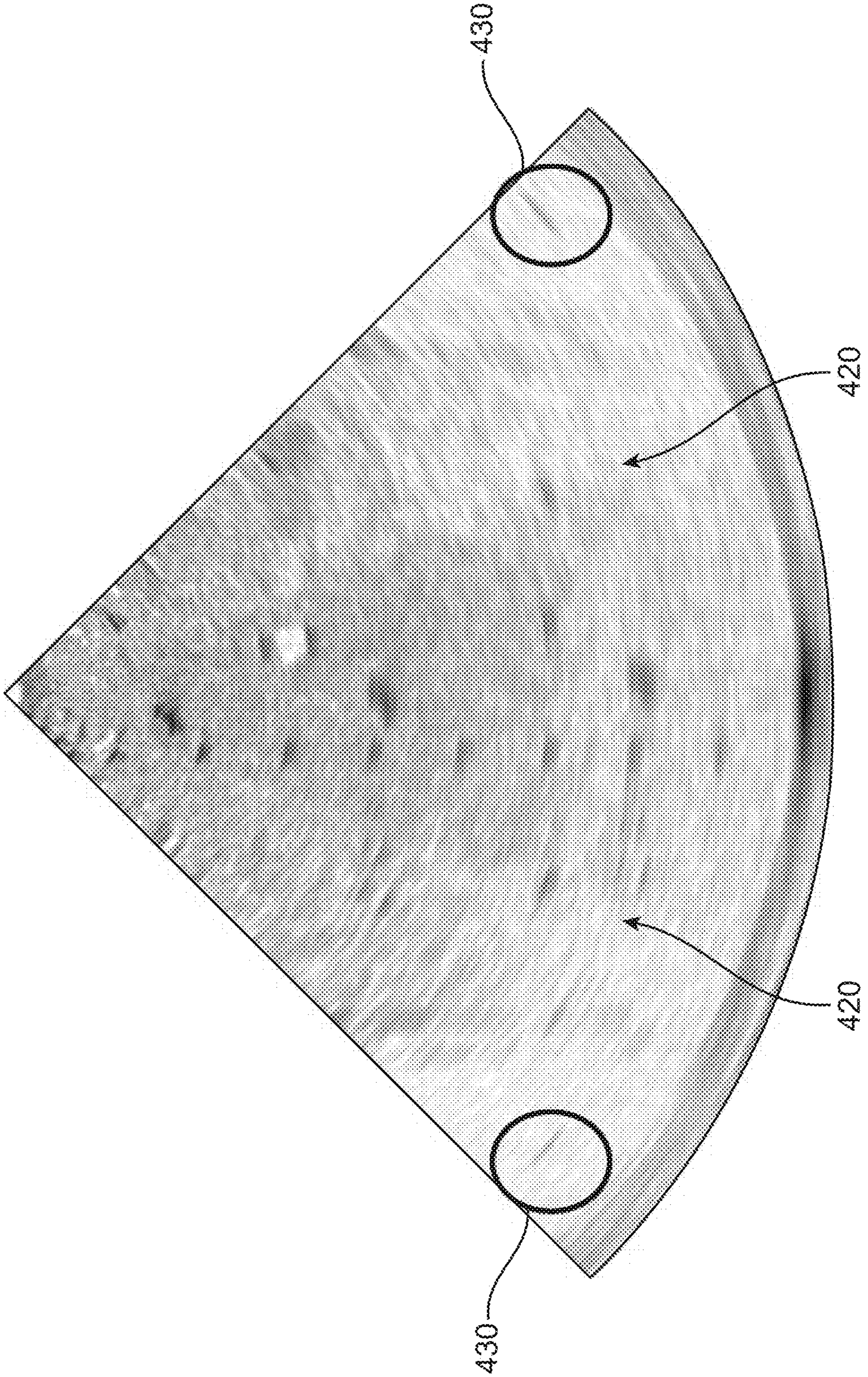
FIG. 4 is an ultrasound image taken with a MUT array similar to that of FIGS. 2 and 3, in accordance with embodiments. The "spotlight" effect is highlighted by the two arrows 420, while the "ghosting" artifacts are circled 430.

The location of the cross-talk trenches 103 will impact the amount of attenuation provided by the trenches. The velocity data from FIG. 3 suggests that interfacial waves at the interface 110 account for some of the cross-talk energy. Interfacial waves, such as Rayleigh waves, typically affect the interface region and the material within some distance of the interface characterized by the wavelength of the travelling wave. In this case, a trench 103 attached to the surface of the substrate 100 and intersecting the interface 110 will be optimal compared to a buried cross-talk trench 104 that is not near the interface 110, such as those depicted in FIGS. 6A and 6B.

Figure 7A:
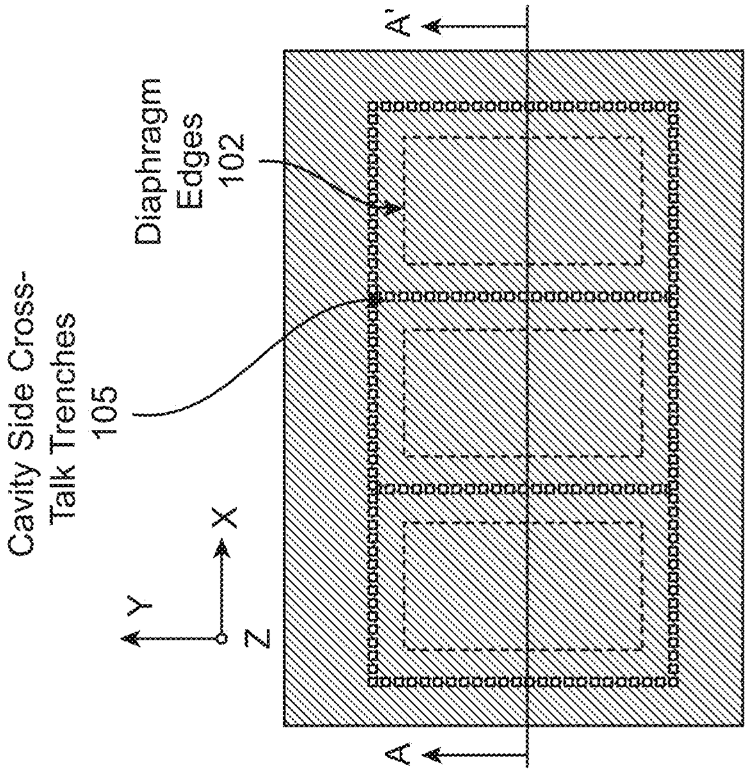
FIGS. 7A and 7B are exemplary schematic diagrams showing (a) layout and (b) cross-section views of a generalized MUT array (101*a*-101*c*) with cavity-side cross-talk trenches 105, in accordance with embodiments.
Figure 7B:
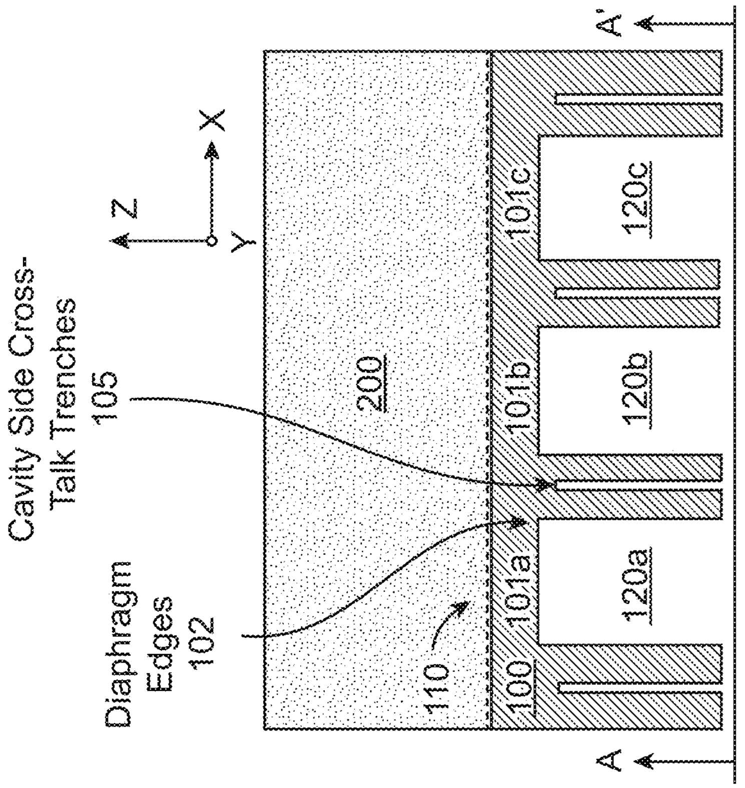

FIGS. 7A and 7B are exemplary schematic diagrams showing (a) layout and (b) cross-section views of a generalized MUT array (101*a*-101*c*) with cavity-side cross-talk trenches 105. In some embodiments, the substrate 100 comprises a cavity-side trench 105 at least partially around a perimeter of the cavity 120*a*-120*c* of the plurality of MUTs. The trench 105 introduces an impedance mismatch between the substrate 100 and whatever material is within the cross-talk trenches 105. This impedance mismatch disrupts the cross-talk waves through attenuation, reflection, and scattering. The cavity-side trenches 105 are effective in reducing cross-talk velocity by increasing elastic wave pathlength.

Figure 8B:
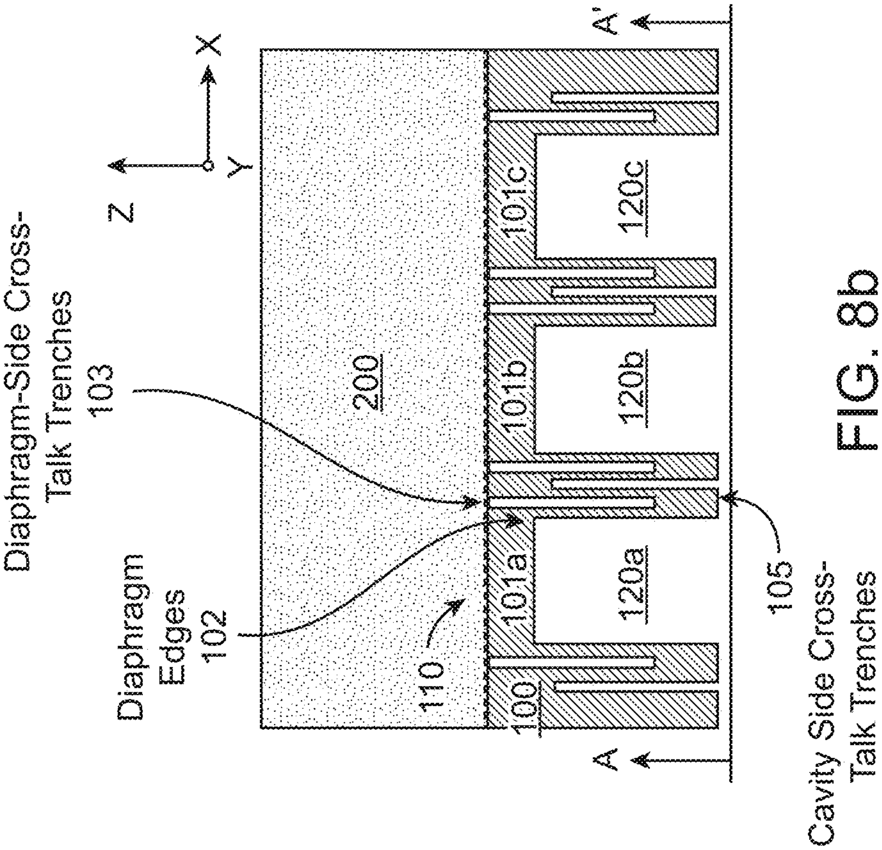
FIGS. 8A and 8B are exemplary schematic diagrams showing (a) layout and (b) cross-section views of a generalized MUT array (101*a*-101*c*) with both diaphragm-side 103 and cavity-side 105 cross-talk trenches, in accordance with embodiments.
Figure 8A:
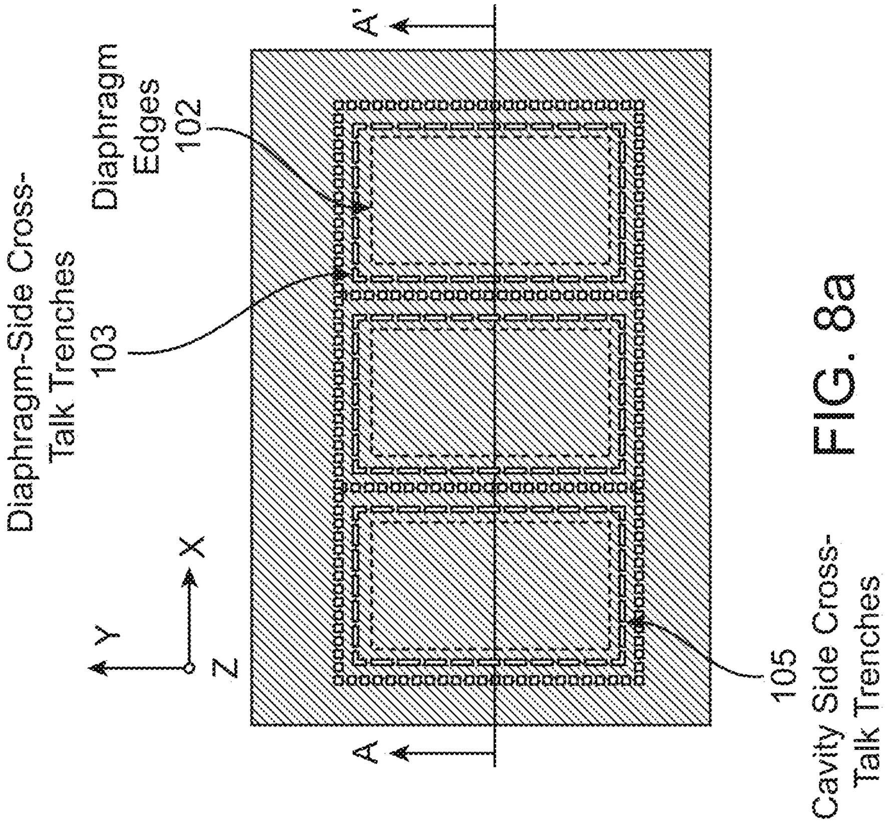

FIGS. 8A and 8B are exemplary schematic diagrams showing (a) layout and (b) cross-section views of a generalized MUT array (101*a*-101*c*) with both diaphragm-side 103 and cavity-side 105 cross-talk trenches. In some embodiments, the substrate 100 comprises both diaphragm-side trenches 103 and cavity-side trenches 105. In at least some instances, the combination of diaphragm-side trenches 103 and cavity-side trenches 105 can reduce cross-talk effects (e.g., by lowering velocity and/or lowering amplitude of the cross-talk effects) beyond that of either trench type alone.

In some embodiments, the substrate 100 comprises diaphragm-side trenches 103, buried trenches 104, and cavity-side trenches 105.

FIGS. 9A to 9D are cross-sectional views of a capacitive MUT with buried cavity with (a) diaphragm-side cross-talk trenches 103, (b) buried cross-talk trenches 104, (c) cavity side cross-talk trenches 105, and (d) both cavity side 105 and diaphragm side 103 cross talk trenches. The MUT array 210 comprises a substrate 100 and a plurality of MUTs 101*a*-101*c*. The plurality of MUTs 101*a*-101*c* are affixed to a surface of the substrate 100. Each MUT 101*a*-101*c* comprises a moveable diaphragm formed in or on top of the substrate 100 by buried cavities 130*a*, 130*b*, and 130*c*. The substrate 100 comprises a trench 103, 104, and/or 105 at least partially around a perimeter of the diaphragm 101*a*-101*c* of the plurality of MUTs. The trench 103, 104, and/or 105 introduces an impedance mismatch between the substrate 100 and whatever material is within the cross-talk trenches 103, 104, and/or 105. This impedance mismatch disrupts the cross-talk waves through attenuation, reflection, and scattering.

In some embodiments, a trench 103, 104, or 105 is formed via deep reactive ion etching (DRIE), plasma etching, wet etching, or other etching techniques which will be apparent to one of ordinary skill in the art based on the teachings here.

In some embodiments, a trench 103, 104, or 105 has a constant distance from the perimeter of the diaphragm or cavity between 1 μm and 40 μm (e.g., between 10 μm and 40 μm). Alternatively, or in combination, in some embodiments the trench 103, 104, or 105 has a variable distance from the perimeter of the diaphragm or cavity between 1 μm and 40 μm (e.g., between 10 μm and 40 μm). The distance of trench 103, 104, or 105 from the perimeter of the diaphragm or cavity can be as close (e.g., atomically close) or as far as desired.

In some embodiments, a trench 103, 104, or 105 is around at least 50%, 70%, or 90% of the perimeter of the diaphragm or cavity. In some embodiments, a trench 103, 104, or 105 is around the entire perimeter of the diaphragm or cavity.

In some embodiments, a trench 103, 104, or 105 is at least partially around a perimeter of the diaphragm or cavity of at least 10%, at least 20%, at least 30%, at least 40%, at least 50%, at least 60%, at least 70%, at least 80%, or at least 90% of the MUTs of the plurality of MUTs. In some embodiments, a trench 103, 104, or 105 is at least partially around a perimeter of the diaphragm or cavity of each MUT of the plurality of MUTs.

In some embodiments, a trench 103, 104, or 105 is at least partially around a perimeter of the diaphragm or cavity on a first lateral side of the MUT. Optionally, a second trench 103, 104, or 105 is at least partially around a perimeter of the diaphragm or cavity on a second lateral side of the MUT. In some embodiments, the MUT has trenches 103, 104, or 105 on both lateral sides thereof. In some embodiments, the trenches 103, 104, or 105 are symmetrically disposed around the perimeter of the diaphragm or cavity. In some embodiments, the trenches 103, 104, or 105 are asymmetrically disposed around the perimeter of the diaphragm or cavity. In some embodiments, the MUT has a trench 103, 104, or 105 on a single lateral side thereof.

Figure 10:
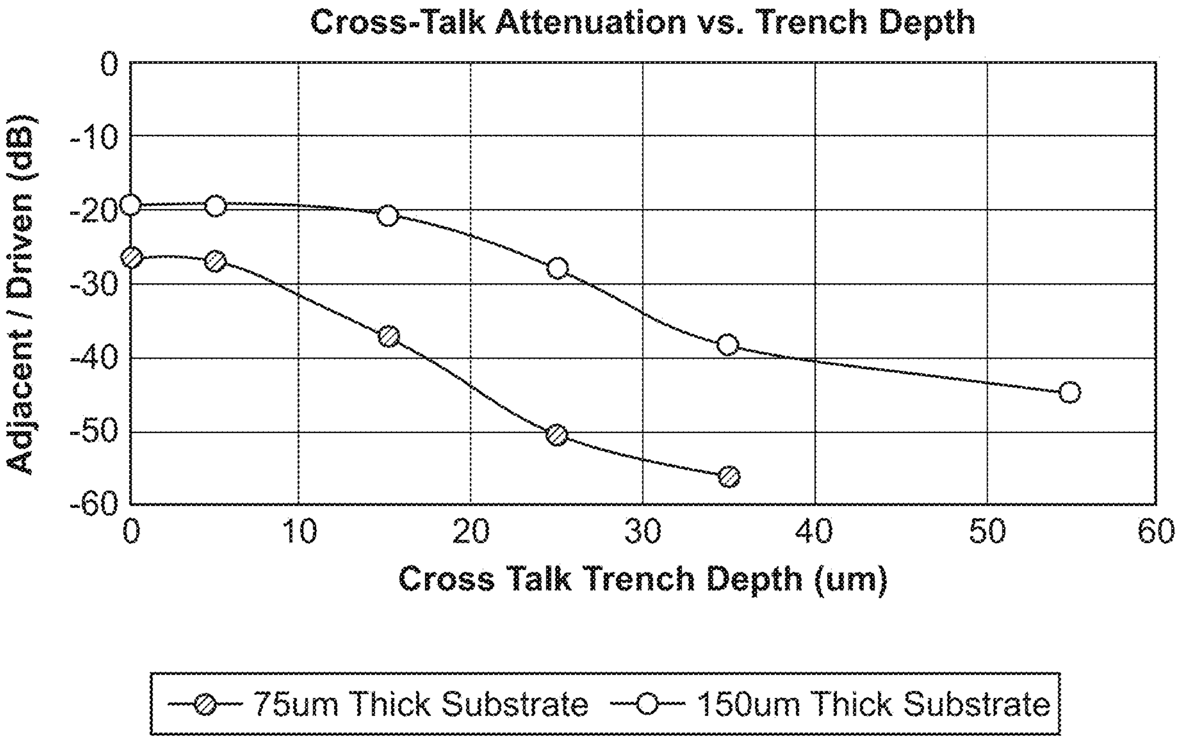
FIG. 10 is a graph showing a simulated attenuation of cross-talk trenches 103 versus trench depth for multiple substrate thicknesses, in accordance with embodiments. The y-axis is the maximum velocity of the element adjacent to the element being actuated, divided by the maximum velocity of the actuated element, in dB.

The depth of the cross-talk trenches 103, 104, or 105 will impact the attenuation, as illustrated in FIG. 10. FIG. 10 is a graph showing a simulated attenuation of cross-talk trenches 103 versus trench depth (ranging from 0-55 μm) for multiple substrate thicknesses (75 μm or 150 μm). The y-axis is the maximum velocity of the element adjacent to the element being actuated, divided by the maximum velocity of the actuated element, in dB. In this case, simulations show that deeper cross-talk trenches 103 are more effective than shallow trenches. This is because both interfacial and longitudinal waves have a vertical spatial extent. Trenches with a greater depth result in a larger proportion of the cross-talk waves disrupted by the trench.

In some embodiments, a trench 103, 104, or 105 runs from the surface (diaphragm-side or cavity-side) of the substrate to at least 10%, at least 50%, or at least 90% the thickness of the substrate. In some embodiments, the trench runs the entire thickness (e.g., 100%) of the substrate. In some embodiments, the trench runs from the surface (diaphragm-side or cavity-side) of the substrate to about 1% the thickness of the substrate.

In some embodiments, a trench 103, 104, or 105 runs from below the surface (diaphragm-side or cavity-side) of the substrate to at least 10%, at least 50%, or at least 90% the thickness of the substrate.

Finally, the trench lateral width will also affect the attenuating properties of the cross-talk trenches 103, 104, or 105, particularly if the trenches are filled with a high attenuation material. Larger lateral dimensions and/or greater number of trenches produces better cross-talk attenuation. In most common MUT arrays, the lateral width of the cross-talk trenches 103 and 104 will be limited by packing densities of the MUTs.

In some embodiments, a trench 103, 104, or 105 has a constant width between 1 μm and 40 μm. In some embodiments, a trench 103, 104, or 105 has a constant width between 1 μm and 100 μm. In some embodiments, a trench 103, 104, or 105 has a constant width between 5 μm and 10 μm. The width of trench 103, 104, or 105 can be as thin (e.g., atomically thin) or as large as desired.

In some embodiments, a trench 103, 104, or 105 has a variable width between 1 μm and 40 μm. In some embodiments, a trench 103, 104, or 105 has a variable width between 1 μm and 100 μm. In some embodiments, a trench 103, 104, or 105 has a variable width between 5 μm and 10 μm. The width of trench 103, 104, or 105 can be as thin (e.g., atomically thin) or as large as desired.

In some embodiments, a trench 103, 104, or 105 is at least partially filled with an acoustic attenuation material. Alternatively, or in combination, in some embodiments a trench 103, 104, or 105 is at least partially filled with an acoustic attenuation material.

In some embodiments, there is one trench 103, 104, or 105 per MUT. In some embodiments, there is one trench 103, 104, or 105 per adjacent pair of MUTs. In some embodiments, trenches 103, 104, or 105 can intersect and run between MUTs as one continuous trench. In some embodiments, there is fewer than one trench 103, 104, or 105 per pair of MUTs. In some embodiments, there is more than one trench 103, 104, or 105 per MUT.

In some embodiments, there is more than one trench 103, 104, or 105 per MUT. For example, each MUT has a first proximal trench on a first lateral side of the MUT and a second proximal trench on a second lateral side of the MUT, such that each adjacent pair of MUTs has at least two trenches between them. The proximal trench on the first lateral side of a first MUT and the proximal trench on the second lateral side of a second MUT may be disposed in the substrate between the first and second MUTs. In some embodiments, a central trench may be disposed between the proximal trenches, for a total of at least three trenches between the adjacent first and second MUTs. In some embodiments, the proximal and central trenches are formed in the same surface (diaphragm-side or cavity-side) of the substrate. In some embodiments, the proximal and central trenches are formed in different surfaces of the substrate. For example, the proximal trenches 103 may be formed in the diaphragm-side and the central trench 105 may be formed in the cavity-side as shown in FIGS. 8B and 9D. In at least some instances, the combination of proximal diaphragm-side trenches 103 and central cavity-side trenches 105 can reduce cross-talk effects (e.g., by lowering velocity and/or lowering amplitude of the cross-talk effects) beyond that of either trench type alone.

In some embodiments, all trenches 103, 104, or 105 of the MUT array have the same dimensions. In some embodiments, one or more of the trenches 103, 104, or 105 has different dimensions. For example, the central trench 105 shown in FIGS. 8B and 9D may be wider than the proximal trenches 103.

In some embodiments, there is one trench 103, 104, or 105 per MUT surrounding at least 80% of the MUT. Alternatively, or in combination, there is one trench 103, 104, or 105 down each row of MUTs. Alternatively, or in combination, there is one trench 103, 104, or 105 down each column of MUTs. Alternatively, or in combination, there is one trench 103, 104, or 105 down each row of MUTs and one trench 103, 104, or 105 down each column of MUTs. Alternatively, or in combination, there are multiple trenches 103, 104, or 105 around each MUT.

Figure 11A:
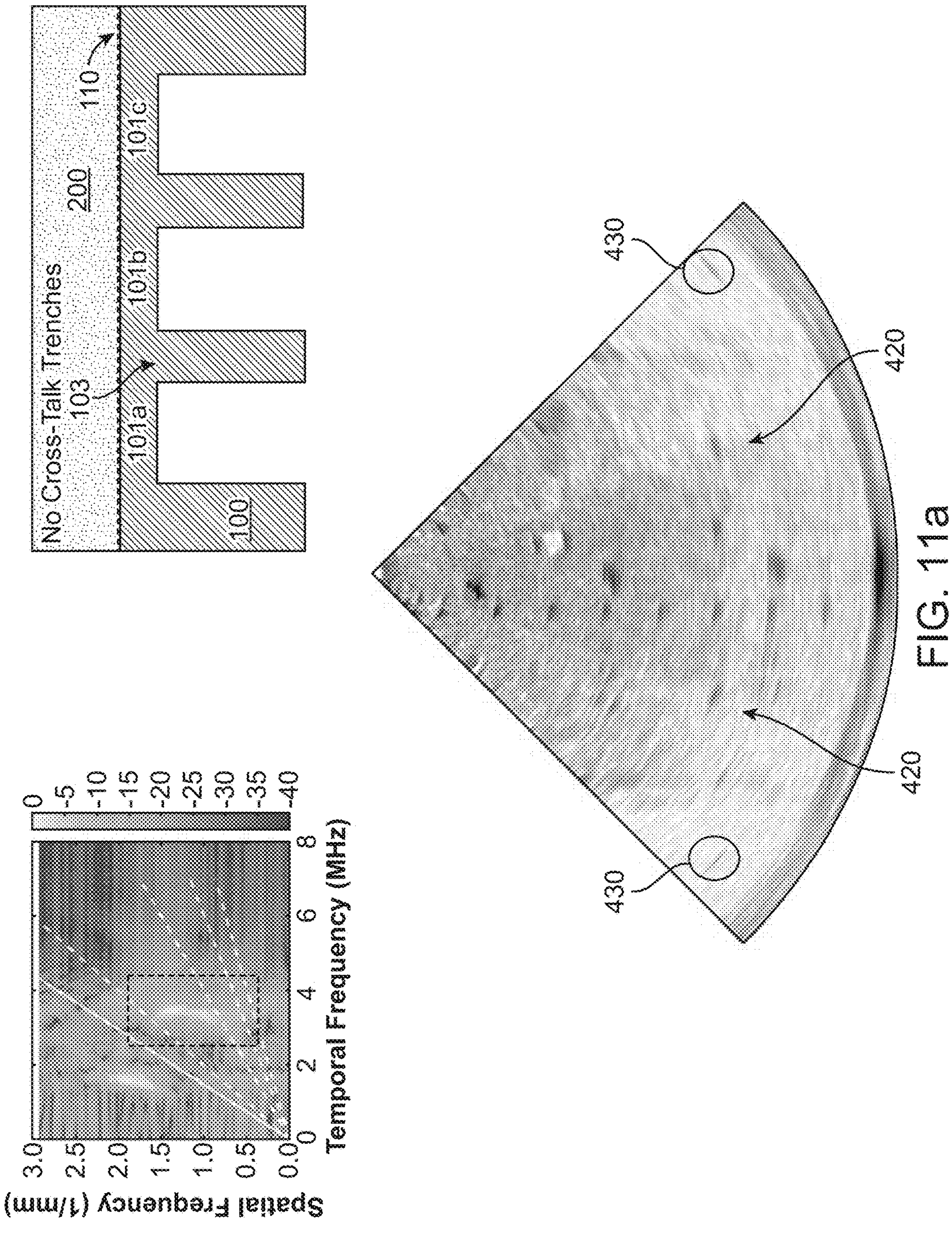
FIGS. 11A and 11B show a comparison of f-k and images of MUT arrays (b) with and (a) without cross-talk trenches (75 μm deep in 150 μm silicon substrate), in accordance with embodiments.
Figure 11B:
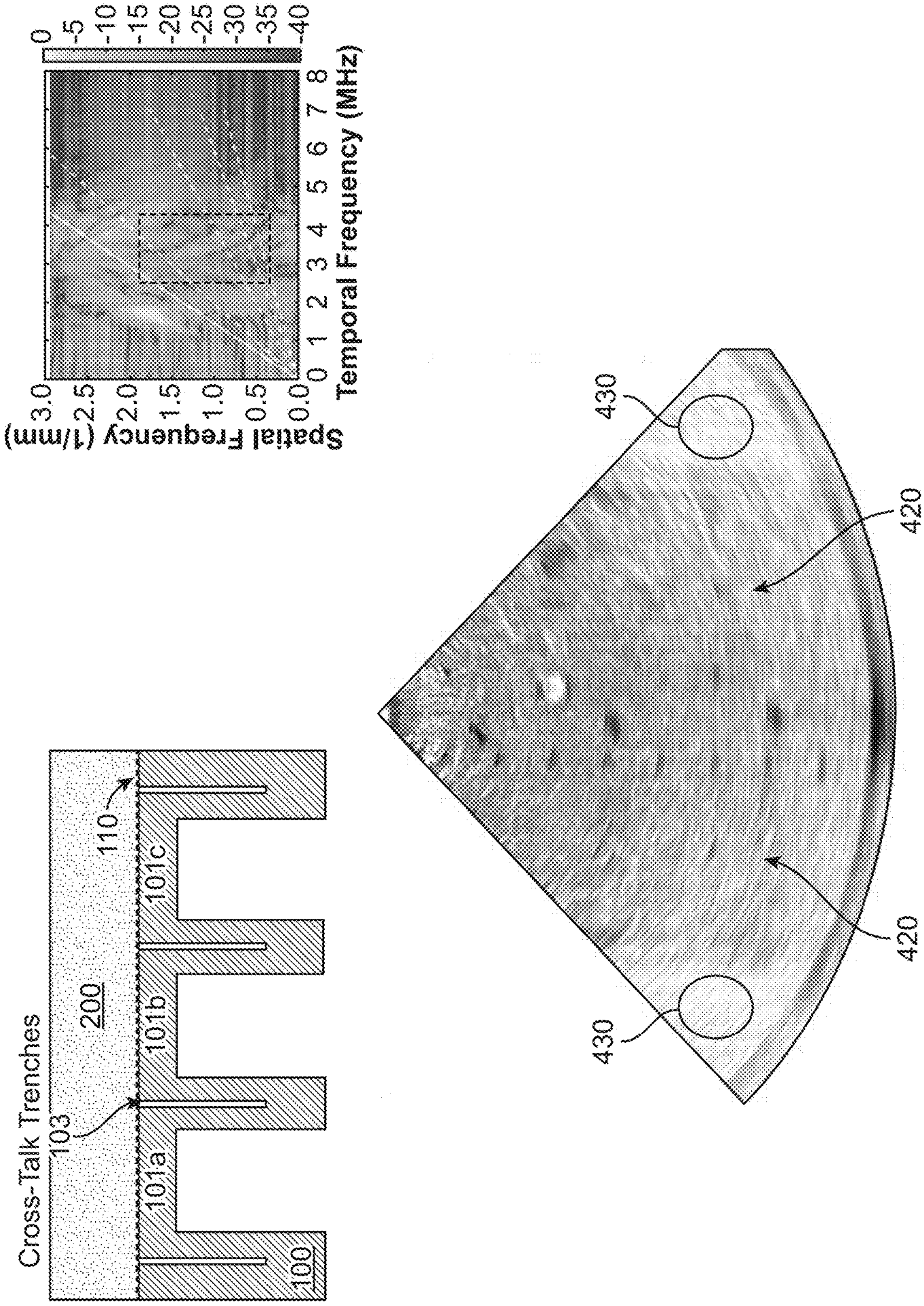

The efficacy of such trenches has been demonstrated in silicon MUT arrays with 150 μm substrates. FIG. 11A shows f-k and images of an MUT array 101*a*-101*c* without cross-talk trenches. FIG. 11B shows f-k and images of an MUT array 101*a*-101*c* with cross-talk trenches 103 (75 μm deep in 150 μm silicon substrate). As FIGS. 11A and 11B show, the cross-talk trenches 103 effectively reduce the cross-talk energy and remove the "spotlight" 420 and ghosting 430 artifacts associated with cross-talk.

Method of Manufacture for pMUT with Trenches

An exemplary method of manufacture for a pMUT with trenches, such as the pMUTs shown by FIGS. SA to 8B is now described.

(a) First, a substrate (e.g., substrate 402 or 100), typically single crystal silicon, is provided.

Figure 6B:
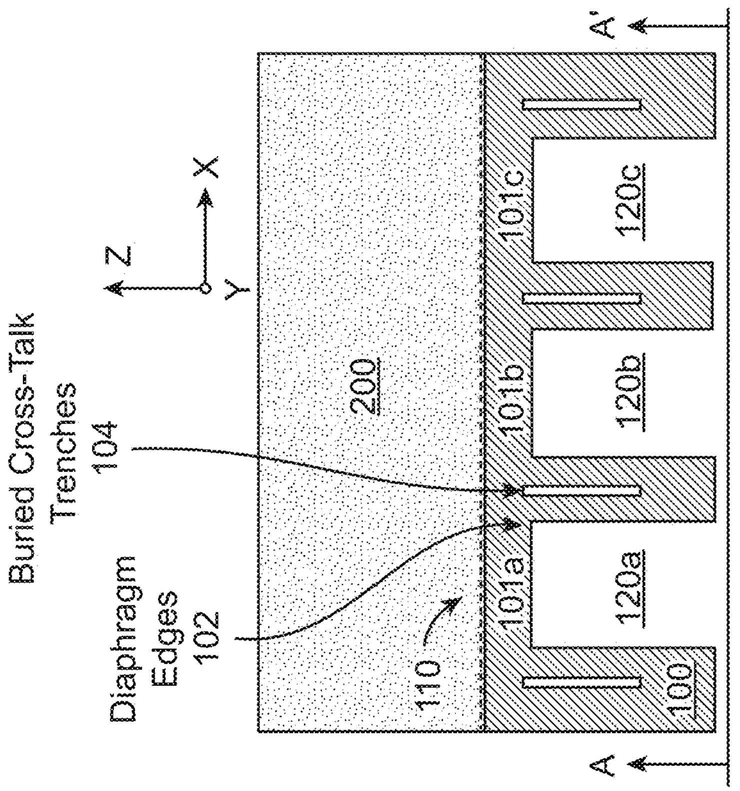
FIGS. 6A and 6B are exemplary schematic diagrams showing (a) layout and (b) cross-section views of a generalized MUT array (101*a*-101*c*) with buried cross-talk trenches 104, in accordance with embodiments.
Figure 6A:
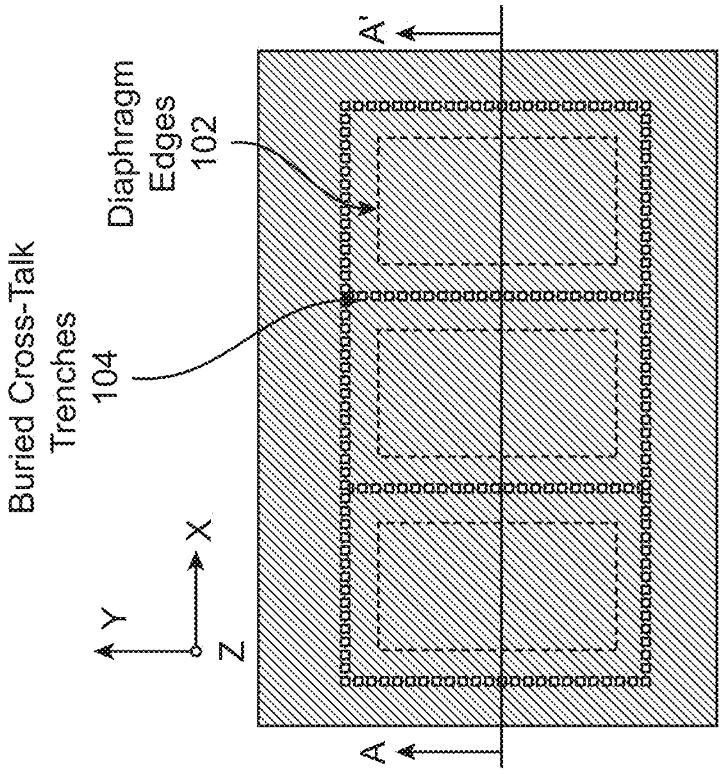

(b) If desired, buried cross-talk trenches 104 may be patterned and etched in the substrate to generate a "handle" wafer. Another silicon "device" wafer may be thermally oxidize and then fusion bonded to the "handle" to form the buried trenches 104 therebetween (e.g., as shown in FIGS. 6A and 6B). The "device" wafer may be ground and polished to the desired diaphragm thickness.

(c) An insulating layer can then be deposited over the substrate. The insulating layer is typically some form of $SiO_2$, about 0.1 μm to 3 μm thick. It is commonly deposited via thermal oxidation, PECVD deposition, or other technique.

(d) A first metal layer 408 (also referred to as M1 or metal 1) can then be deposited. Typically, this is a combination of films that adhere to the substrate, prevent diffusion of the piezoelectric, aid the piezoelectric in structured deposition/growth, and which is conductive. SRO ($SrRuO_3$) may be used for structured film growth, on top of Pt for a diffusion barrier and conduction, on top of Ti as an adhesive layer (for Pt to $SiO_2$). Usually, these layers are thin, less than 200 nm, with some films 10 to 40 nm. Stress, manufacturing, and cost issues will usually limit this stack to less than 1 μm. The conductor (Pt) is typically thicker than the structuring layer (SRO) and adhesion layer (Ti). Other common structuring layers, rather than SRO, include $(La0.5Sr0.5)CoO_3$, $(La0.5Sr0.5)MnO_3$, $LaNiO_3$, $RuO_2$, $IrO_2$, $BaPbO^3$, to name a few. Pt can be replaced with other conductive materials such as Cu, Cr, Ni, Ag, Al, Mo, W, and NiCr. These other materials usually have disadvantages such as poor diffusion barrier, brittleness, or adverse adhesion, and Pt is the most common conductor used. The adhesion layer, Ti, can be replaced with any common adhesion layers such as TiW, TiN, Cr, Ni, Cr, etc.

(e) A piezoelectric material 410 can then be deposited. Some common examples of suitable piezoelectric materials include: PZT, KNN, PZT-N, PMN-Pt, AlN, Sc—AlN, ZnO, PVDF, and $LiNiO_3$. The thicknesses of the piezoelectric layer may vary between 100 nm and 5 μm or possibly more.

(f) A second metal layer 412 (also referred to as M2 or metal 2) can then be deposited. This second metal layer 412 may be similar to the first metal layer 408 and may serve similar purposes. For M2, the same stack as M1 may be used, but in reverse: Ti for adhesion on top of Pt to prevent diffusion on top of SRO for structure.

(g) The second metal layer or M2 412 may then be patterned and etched, stopping on the piezoelectric layer. Etches can be made in many ways herein, for example, via RIE (reactive ion etching), ion mill, wet chemical etching, isotropic gas etching, etc. After patterning and etching, the photoresistor used to pattern M2 may be stripped, via wet and/or dry etching. In many embodiments for manufacturing cMUTs and pMUTs described herein, any number of ways of etching may be used, and the photoresist is typically stripped after most pattern and etch steps.

(h) The piezoelectric layer may then be similarly patterned and etched, stopping at the first metal layer or M1 408. Typically, wet, RIE, and/or ion mill etches are used.

(i) The first metal layer or M1 408 may then be similarly patterned and etched, stopping on the dielectric insulating layer.

(j) If desired, one or both of the following may be added:

(1) An $H_2$ barrier. $H_2$ diffusion into the piezoelectric layer can limit its lifetime. To prevent this, an $H_2$ barrier can be used. 40 nm of ALD (atomic layer deposition) aluminum oxide ($AL_2O_3$) may be used to accomplish this. Other suitable materials may include SiC, diamond-like carbon, etc.

(2) A redistribution layer (RDL). This layer can provide connectivity between M1 and M2 and other connections (e.g., wirebonds, bump bonds, etc.). An RDL can be formed by first adding a dielectric such as oxide, etching vias in the dielectric, depositing a conductor (typically Al), and finally patterning the conductor. Additionally, one might add a passivation layer (typically oxide+nitride) to prevent physical scratches, accidental shorting, and/or moisture ingress.

(k) The diaphragm-side trenches 103 may be patterned and etched (e.g., as shown in FIGS. 5A, 5B, 8A, and 8B). The dielectric layer may be etched via RIE or wet etching. The substrate 100 is typically silicon, and may be etched typically via DRIE (deep reactive ion etching).

(l) Frequently, a silicon on insulator (SOI) substrate is used. In this case, there is a buried insulator layer or buried oxide (BOX) layer just below the diaphragm 101. The diaphragm is then composed of the "device" layer (layer above the BOX), and the "handle" layer under the BOX layer. The cavity in the device layer may stop on the BOX and may be etched out of the Handle layer. In this case, the trench etch may include two extra steps: (1) etching the BOX (typically via dry RIE etching, or in some cases, via wet etching) after the device layer is etched via DRIE, and (2) etching the handle layer via DRIE to the desired depth. Most SOI wafers are silicon, meaning that the device and handle layers will typically be single crystal silicon. The insulator BOX, in this case, is typically a silicon dioxide thermally grown, which is called a "buried oxide", which is where the term "BOX" comes from. A silicon SOI wafer with single crystal silicon handle and device layers with an oxide BOX may typically be used. The device layer may be 5 μm, but typically varies between 100 nm and 100 μm, while the handle layer thickness typically varies between 100 μm and 1000 μm. The BOX is typically between 100 nm and 5 μm, but 1 μm may be used, in many cases.

(m) If desired, the backside of the wafer or handle can be thinned via grinding and optionally polished at this point. In many embodiments, the handle layer is thinned from 500 μm to 300 μm thick. Common thicknesses typically vary between 50 μm and 1000 μm.

(n) The cavity-side trenches 105 may be patterned and etched (e.g., as shown in FIGS. 7A to 8B). The backside of the substrate 100 may be etched typically via DRIE (deep reactive ion etching).

(o) The cavity may be patterned on the backside of the wafer or Handle, and the cavity may be etched. Typically, the wafer/handle is composed of silicon, and the etch is accomplished with DRIE. The etch can be timed. The cavity may be etched at the same time as the cavity-side trench 105. The etch may stop selectively on the BOX. The cavity can be etched via other techniques such as KOH, TMAH, HNA, and RIE. The wafer can be considered complete after photoresist strip.

It will be understood by one of ordinary skill in the art based on the teachings herein that other processes may be used to achieve similar end results.

Method of Manufacture for cMUT with Trenches

An exemplary method of manufacture for a cMUT with trenches, such as the cMUTs shown by FIGS. 9A to 9D is now described.

(a) First, a substrate (e.g., substrate 402 or 100), typically single crystal silicon, is provided.

(b) The substrate may then be thermally oxidized.

(c) The cavities 130*a*, 130*b*, 130*c* may be patterned and etched in the oxide to generate a "handle" wafer. This is typically accomplished through a plasma etch of the oxide or a wet etch (e.g., HF).

(d) If desired, the buried cross-talk trenches 104 may be patterned and etched in the oxide of the "handle" wafer. This is typically accomplished through a plasma etch of the oxide or a wet etch (e.g., HF).

(e) A silicon "device" wafer may then be fusion bonded to the patterned oxide "handle" wafer. If desired, the "device" wafer may be patterned and etched (e.g., via DRIE) to correspond to the buried trenches 104 in the "handle" wafer prior to fusion bonding, such that fusion bonding of the "handle" and the "device" wafers forms the buried trenches 104 (e.g., as shown in FIG. 9B).

(f) The "device" wafer may be ground and polished to the desired diaphragm thickness.

Figure 9A:
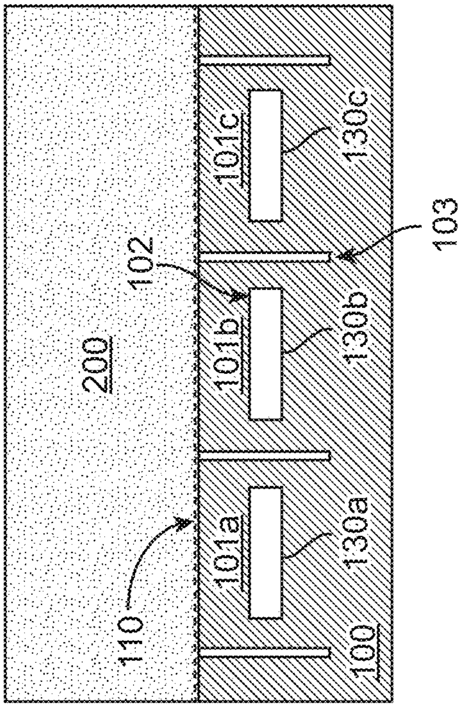
FIGS. 9A to 9D are cross-sectional views of a capacitive MUT with buried cavity with (a) diaphragm-side cross-talk trenches 103, (b) buried cross-talk trenches 104, (c) cavity side cross-talk trenches 105, and (d) both cavity side 105 and diaphragm side 103 cross talk trenches, in accordance with embodiments.
Figure 9B:
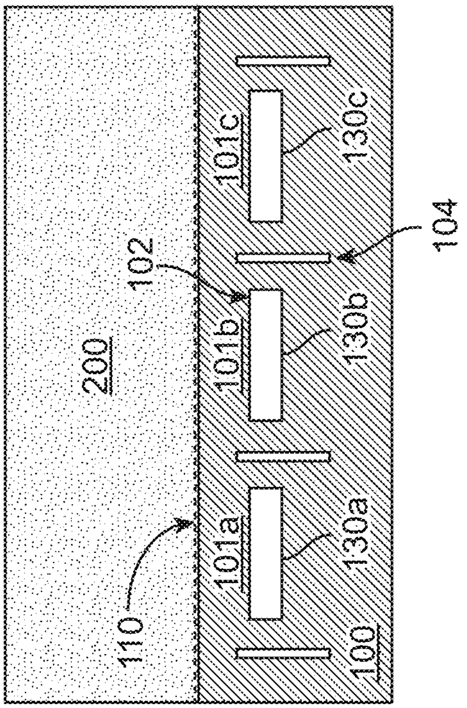
Figure 9C:
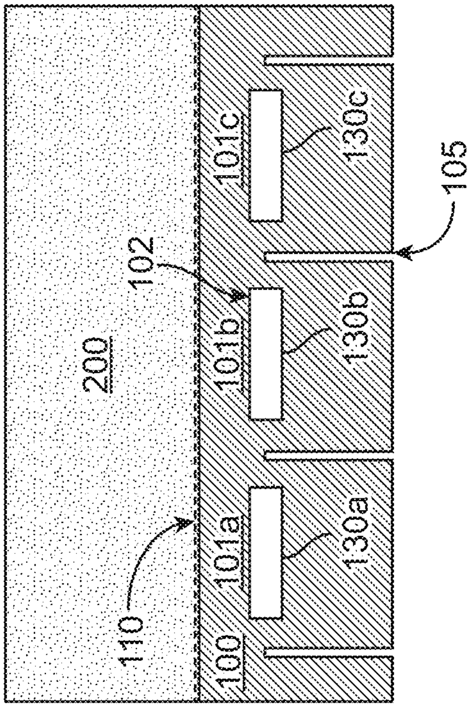
Figure 9D:
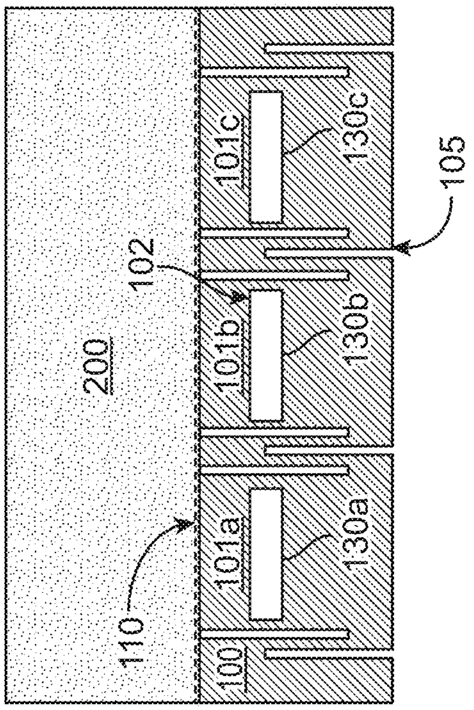

(g) The diaphragm-side trenches 103 may be patterned and etched (e.g., as shown in FIGS. 9A and 9D) into the diaphragm side of the ground and polished wafer.

(h) The cavity-side trenches 105 may be patterned and etched (e.g., as shown in FIGS. 9C and 9D) into the cavity side of the ground and polished wafer.

It will be understood by one of ordinary skill in the art based on the teachings herein that other processes may be used to achieve similar end results.

EXAMPLES

The following illustrative examples are representative of embodiments of the software applications, systems, and methods described herein and are not meant to be limiting in any way.

Example 1—Cavity-Side Trench Azimuthal Responses

Figure 12A:
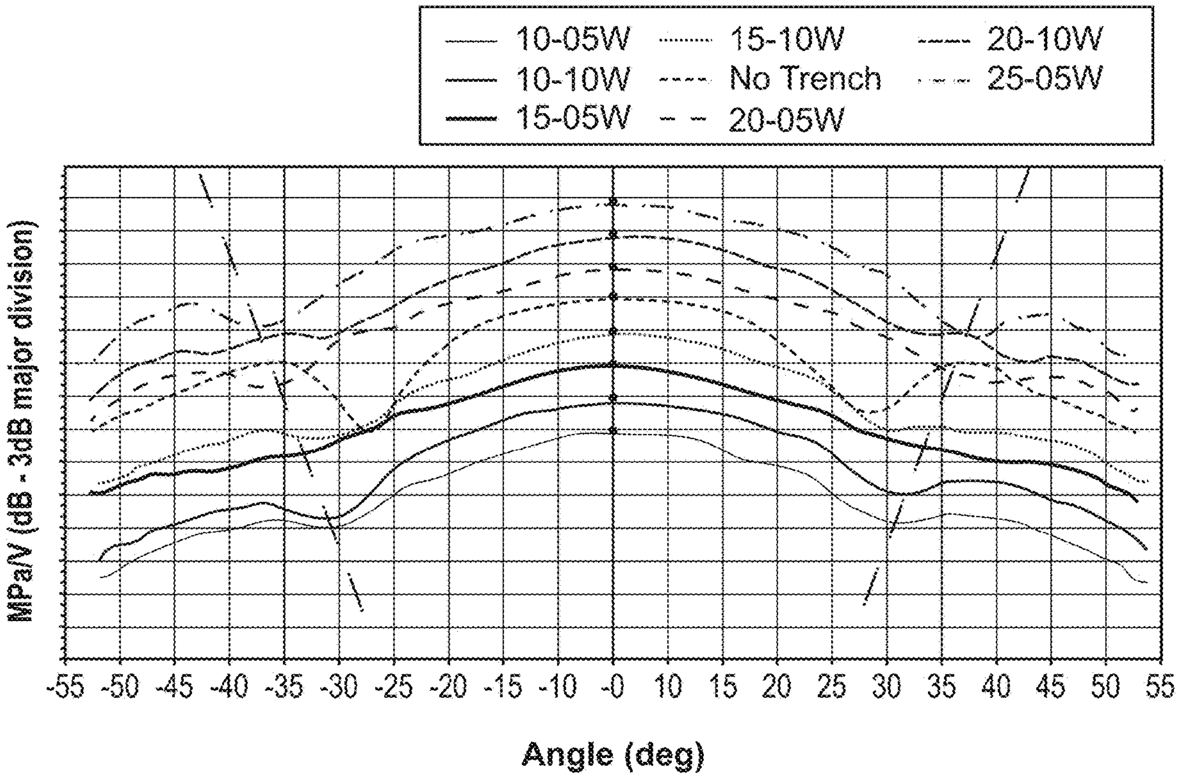
FIGS. 12A and 12B show Azimuthal response at 3.50 MHz, 3 dB shift for 50 μm and 25 μm deep cavity-side trenches, respectively, at a variety of stand-offs and widths, in accordance with embodiments.
Figure 12B:
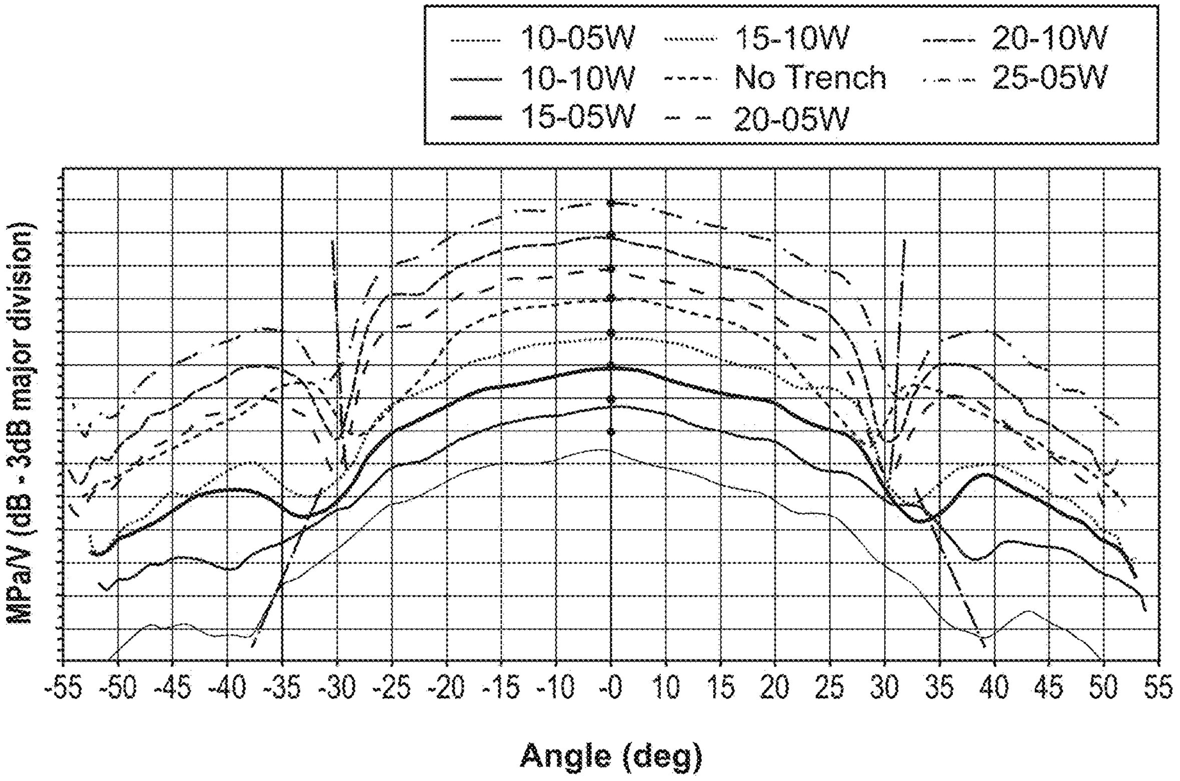

Test pMUT wafers were fabricated with variable depth (25 μm, 37.5 μm, and 50 μm on a 75 μm thick pMUT) and standoff distance (10 μm, 15 μm, 20 μm, and 25 μm) of the trench from the cavity, and width of the of the trench (5 μm and 10 μm). The Azimuthal response of the pMUTs at various frequencies was measured. FIGS. 12A and 12B show Azimuthal response at 3.50 MHz, 3 dB shift for 50 μm and 25 μm deep cavity-side trenches, respectively, at a variety of stand-offs and widths. The naming convention "XX-YYW" is such that XX=the standoff distance and YY=the width. Thus, a 20-05W is a trench 20 μm from the cavity, and 5 μm width. As shown in FIG. 12A, the spotlight angle for a 50 μm deep cavity-side trench appears to push further out with increasing trench standoff distance. As shown in FIG. 12B, the spotlight angle for a 25 μm deep cavity-side trench does not have a linear correlation with trench standoff distance, but the general trend is that increasing standoff distance results in narrower spotlight angle. Cross-talk dip occurred at 3.5 MHz, particularly in 20-10W (20 μm standoff, 10 μm width) at 25 μm depth at about +/−28 degrees.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A micromachined ultrasonic transducer (MUT) array comprising:

a substrate and a plurality of MUTs;

the plurality of MUTs affixed to a surface of the substrate, each MUT comprising a movable diaphragm and a cavity formed in the substrate beneath the movable diaphragm, wherein the cavity extends into the substrate from a cavity side of the substrate;

the substrate comprising a cavity-side cross-talk trench extending into the substrate from the cavity side of the substrate and extending around at least 50% of a perimeter of the movable diaphragm of one or more MUTs of the plurality of MUTs, wherein the cavity and the cavity-side cross-talk trench each extend into the substrate by at least half of a thickness of the substrate, and wherein each cavity-side cross-talk trench is configured to reduce the cross-talk of each of the one or more MUTs from adjacent MUTs.

2. The MUT array of claim 1, wherein each MUT in the plurality of MUTs is a pMUT.

3. The MUT array of claim 1, wherein each MUT in the plurality of MUTs is a cMUT.

4. The MUT array of claim 1, wherein the trench extends into the substrate by at least 90% of a thickness of the substrate.

5. The MUT array of claim 4, wherein the trench extends through an entirety of the thickness of the substrate.

6. The MUT array of claim 1, wherein the trench has a constant width between 1 μm and 40 μm.

7. The MUT array of claim 1, wherein the trench has a variable width between 1 μm and 40 μm.

8. The MUT array of claim 1, wherein the trench has a constant distance from the perimeter of the movable diaphragm between 1 μm and 40 μm.

9. The MUT array of claim 1, wherein the trench has a variable distance from the perimeter of the movable diaphragm between 1 μm and 40 μm.

10. The MUT array of claim 1, wherein the trench is around at least 60%, 70%, 80%, or 90% of the perimeter of the movable diaphragm.

11. The MUT array of claim 10, wherein the trench is around the entire perimeter of the movable diaphragm.

12. The MUT array of claim 1, wherein the trench is at least partially around a perimeter of the movable diaphragm of at least 10%, at least 20%, at least 30%, at least 40%, at least 50%, at least 60%, at least 70%, at least 80%, or at least 90% of the MUTs of the plurality of MUTs.

13. The MUT array of claim 12, wherein the trench is at least partially around a perimeter of the movable diaphragm of each MUT of the plurality of MUTs.

14. The MUT array of claim 1, wherein the trench is at least partially filled with an acoustic attenuation material.

15. The MUT array of claim 1, wherein the plurality of MUTs are arranged in a plurality of columns and a plurality of rows.

16. The MUT array of claim 15, wherein the trench runs along a row of MUTs.

17. The MUT array of claim 15, wherein each row of MUTs has a trench running therealong.

18. The MUT array of claim 15, wherein the trench runs along a column of MUTs.

19. The MUT array of claim 15, wherein each column of MUTs has a trench running therealong.

20. The MUT array of claim 15, wherein each row of MUTs has a first trench running therealong and each column of MUTs has a second trench running therealong.

21. The MUT array of claim 1, wherein the trench is at least partially around a perimeter of the movable diaphragm of a single MUT of the plurality of MUTs.

22. The MUT array of claim 1, wherein each MUT of the plurality of MUTs is at least partially surrounded by a trench.

23. The MUT array of claim 1, further comprising at least a second trench at least partially around the perimeter of the movable diaphragm of one or more MUTs of the plurality of MUTs.

24. The MUT array of claim 23, wherein the second trench is at least partially around the perimeter of the movable diaphragm of a single MUT of the plurality of MUTs.

25. The MUT array of claim 23, wherein each MUT of the plurality of MUTs is at least partially surrounded by a first trench and a second trench.

26. The MUT array of claim 1, wherein the trench is disposed between an adjacent pair of MUTs.

27. The MUT array of claim 1, wherein the substrate comprises a plurality of trenches at least partially around the perimeter of the movable diaphragm of one or more MUTs of the plurality of MUTs.

28. The MUT array of claim 27, wherein the substrate comprises one trench per MUT of the plurality of MUTs.

29. The MUT array of claim 27, wherein the substrate comprises one trench per adjacent pair of MUTs of the plurality of MUTs.

30. The MUT array of claim 27, wherein the substrate comprises fewer than one trench per MUT of the plurality of MUTs.

31. The MUT array of claim 27, wherein the substrate comprises fewer than one trench per adjacent pair of MUTs of the plurality of MUTs.

32. The MUT array of claim 1, further comprising a cross-talk trench buried within the substrate.

33. The MUT array of claim 1, further comprising a diaphragm-side trench extending into the substrate from a diaphragm side of the substrate and a cavity-side trench extending into the substrate from a cavity side of the substrate.

34. The MUT array of claim 33, wherein the diaphragm-side trench and the cavity-side trench extend partially through a thickness of the substrate.

35. The MUT array of claim 1, wherein the trench comprises a pattern of trenches that collectively surround the perimeter of the movable diaphragm of the one or more MUTs of the plurality of MUTs.

36. The MUT array of claim 35, wherein each trench in the pattern of trenches comprises a rectangular profile, the rectangular profile being in a plane that is parallel to a plane of the movable diaphragm.

37. The MUT array of claim 35, wherein each trench in the pattern of trenches comprises a square profile, the square profile being in a plane that is parallel to a plane of the movable diaphragm.

* * * * *